US011410267B1

(12) United States Patent
Gatson et al.

(10) Patent No.: US 11,410,267 B1
(45) Date of Patent: Aug. 9, 2022

(54) SYSTEMS AND METHODS FOR MANAGING GRAPHICS PROCESSOR USAGE BY MODERN WORKSPACES

(71) Applicant: Dell Products, L.P., Round Rock, TX (US)

(72) Inventors: Michael S. Gatson, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/198,320

(22) Filed: Mar. 11, 2021

(51) Int. Cl.
| | | |
|---|---|---|
| G06T 1/20 | (2006.01) | |
| H04L 67/1023 | (2022.01) | |
| G06T 1/60 | (2006.01) | |
| H04L 67/75 | (2022.01) | |

(52) U.S. Cl.
CPC .............. G06T 1/20 (2013.01); G06T 1/60 (2013.01); H04L 67/1023 (2013.01); H04L 67/36 (2013.01); *G06T 2200/16* (2013.01)

(58) Field of Classification Search
CPC ......... G06T 1/20; G06T 1/60; G06T 2200/16; H04L 67/1023; H04L 67/36
See application file for complete search history.

(56) References Cited

U.S. PATENT DOCUMENTS

| | | | |
|---|---|---|---|
| 2013/0100017 A1* | 4/2013 | Papakipos ............. | G06F 1/1626 345/158 |
| 2018/0130171 A1* | 5/2018 | Prakash .................... | G06T 1/20 |
| 2020/0053651 A1* | 2/2020 | Lee ........................... | G06F 3/16 |
| 2021/0191771 A1* | 6/2021 | Mccrary ............... | G06F 9/3867 |

OTHER PUBLICATIONS

Kato, Shinpei, et al., "TimeGraph: GPU Scheduling for Real-Time Multi-Tasking Environments", USENIX ATC '11: 2011 USENIX Annual Technical Conference, pp. 17-30 (Year: 2011).*

* cited by examiner

*Primary Examiner* — William A Beutel
(74) *Attorney, Agent, or Firm* — Fogarty LLP

(57) ABSTRACT

Systems and methods for managing graphics processor usage by modern workspaces are described. In an embodiment, an Information Handling System (IHS) may include a processor and a memory coupled to the processor, the memory having program instructions stored thereon that, upon execution, cause the IHS to: determine a graphical processing characteristic of each of a plurality of workspaces, and identify a responsive action for a given one of the plurality of workspaces based, at least in part, upon the graphics processing characteristic of the given workspace.

17 Claims, 10 Drawing Sheets

SYSTEMS AND METHODS FOR MANAGING GRAPHICS PROCESSOR USAGE BY MODERN WORKSPACES

FIELD

This disclosure relates generally to Information Handling Systems (IHSs), and, more specifically, to systems and methods for managing graphics processor usage by modern workspaces.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment that operates on the IHS, where such isolated software environments may be referred to by various names, such as virtual machines, containers, dockers, etc. Various types of such segregated environments are isolated by providing varying degrees of abstraction from the underlying hardware and operating system of the IHS. These virtualized environments typically allow a user to access only data and applications that have been approved for use within that particular isolated environment. In enforcing the isolation of a virtualized environment, applications that operate within such isolated environments may have limited access to capabilities that are supported by the hardware and operating system of the IHS.

SUMMARY

Embodiments of systems and methods for managing graphics processor usage by modern workspaces are described. In an illustrative, non-limiting embodiment, an Information Handling System (IHS) may include a processor and a memory coupled to the processor, the memory having program instructions stored thereon that, upon execution, cause the IHS to: determine a graphical processing characteristic of each of a plurality of workspaces, and identify a responsive action for a given one of the plurality of workspaces based, at least in part, upon the graphics processing characteristic of the given workspace.

For example, the responsive action may include starting or stopping graphics calls from the given workspace. Additionally, or alternatively, the responsive action may include outsourcing graphics calls from the given workspace to a remote server. Additionally, or alternatively, the responsive action may include assigning the given workspace of a dedicated one of a plurality of Graphical Processing Units (GPUs). Additionally, or alternatively, the responsive action may include assigning the given workspace of a shared one of a plurality of GPUs. Additionally, or alternatively, the responsive action may include assigning the given workspace to a different GPU than an originally assigned GPU at instantiation of the given workspace. Additionally, or alternatively, the responsive action may include assigning the given workspace to one of: an integrated GPU, or a discrete GPU.

The program instructions, upon execution, may further cause the IHS to categorize each of the plurality of workspaces based upon one or more graphical processing characteristic of each workspace as: high utilization, medium utilization, or low utilization. Moreover, the program instructions, upon execution, may further cause the IHS to: receive a first graphics call from a first workspace; store the first graphics call in a queue; receive a second graphics call from the second workspace; store the second graphics call in the queue; and process the second graphics call prior to the first graphics call in response to the second workspace having a higher graphics priority than the first workspace.

The program instructions, upon execution, may cause the IHS to determine that the second workspace has a higher graphics priority than the first workspace based upon a second graphics processing characteristic of the second workspace indicating execution of a second application requiring real-time rendering and a first graphics processing characteristic of the first workspace indicating execution of a first application not requiring real-time rendering. The program instructions, upon execution, further cause the IHS to determine that the second workspace has a higher graphics priority than the first workspace based upon context information associated with at least one of the first or second workspaces.

For example, the context information may include at least one of an identity or type of an application being executed in the first or second workspaces, whether the application is executing in a foreground, or whether the application executing in a background. Additionally, or alternatively, the context information may include at least one of: a presence state of a user, or a proximity of the user to a display coupled to the IHS. Additionally, or alternatively, the context information may include at least one of: a location of the IHS or a posture of the IHS.

The program instructions, upon execution, may further cause the IHS to discover one or more attributes of a GPU of the IHS and pass the one or more attributes to the given workspace.

In some cases, the responsive action may be prescribed by a rule of a graphics configuration policy received from a workspace orchestration service. The local management agent may be configured to receive, from a workspace orchestration service, data configured to enable a local management agent to instantiate each of the plurality of workspaces based upon a corresponding one of a plurality of workspace definitions, and wherein each workspace definition identifies whether its respectively workspace is subject to the configuration policy.

The workspace orchestration service is configured to, for each of the plurality of workspaces: (i) calculate a security target and a productivity target based in part upon context information received at the backend server from the local management agent, and (ii) create a workspace definition based upon the security target and the productivity target, and wherein the context information comprises at least one of: an identification of a locale of the client IHS, an identification of a user of the client IHS, an identification of a network of the client IHS, an identification of hardware of the client IHS, an identification of a requested datafile, or an identification of a storage system of the requested datafile.

In another illustrative embodiment, a memory storage device may have program instructions stored thereon that, upon execution by an IHS, cause the IHS to: determine a graphics processing characteristic of each of a plurality of workspaces; and identify a responsive action for a given one of the plurality of workspaces based, at least in part, upon the graphics processing characteristic of the given workspace.

In yet another illustrative, non-limiting embodiment, in an IHS a method may include: determining a graphics processing characteristic of each of a plurality of workspaces; and identifying a responsive action for a given one of the plurality of workspaces based, at least in part, upon the graphics processing characteristic of the given workspace.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
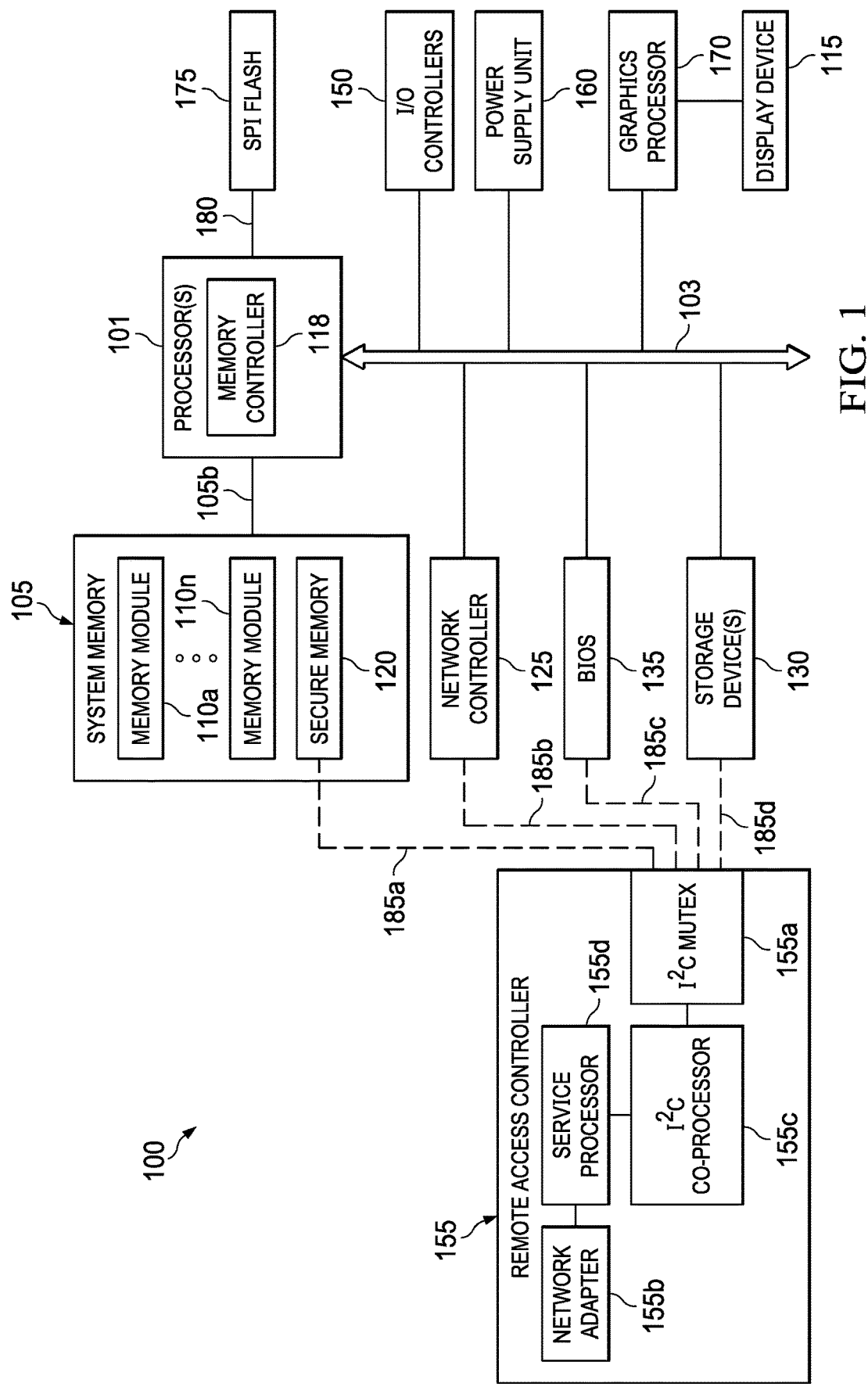
FIG. 1 is a diagram illustrating certain components of an IHS operable, according to some embodiments, to support secure use of resources of the IHS by workspaces operating on the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting certain components of an illustrative IHS 100 that is operable according to various embodiments for secure use of resources of the IHS 100 by workspaces operating on the IHS 100. In some embodiments, IHS 100 may be employed to instantiate, manage, and/or terminate a secure workspace that may provide the user of IHS 100 with access to protected data in an isolated software environment in which the protected data is segregated from: the operating system (OS) of the IHS 100, other applications executed by IHS 100, other workspaces operating on IHS 100 and, to a certain extent, the hardware of the IHS. In some embodiments, the construction of a workspace for a particular purpose and for use in a particular context may be orchestrated remotely from the IHS 100 by a workspace orchestration service, such as described with regard to FIG. 2. In some embodiments, portions of the workspace orchestration may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

As shown in FIG. 1, IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or that may be configured to support specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 105b.

System memory 105 that is coupled to processor(s) 101 via memory bus 105b provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a set of busses that couple processor 101 to various hardware components installed in the same motherboard. In some embodiments, all or portions of chipset 103 may be implemented directly within the integrated circuitry of processor(s) 101. Chipset 103 thus provides processor(s) 101 with access to a variety of hardware resources. In IHS 100, chipset 103 is illustrated as a single coupling with processor 101. However, other implementations may utilize any number of connections to provide the illustrated communication pathways supported by chipset 103. In some instances, capabilities supported by processor 101 are not directly available to workspaces operating on IHS 100 due to the isolation of these workspaces from certain hardware and software of the IHS.

In certain embodiments, IHS 100 may include a SPI (Serial Peripheral Interface) flash device 175 that stores certain data and instructions utilized by processor 101. The SPI flash 175 may be a non-volatile memory device capable of being electrically erased and reprogrammed. SPI flash 175 may be coupled to processor 101 over an SPI bus 180 that supports transfers of blocks of data to and from SPI flash 175. In some embodiments, SPI flash 175 may be divided into various regions, with each region storing different types of instructions and/or data. In certain embodiments, some of the regions of SPI flash 175 may be provisioned during trusted manufacture of IHS 100, such as with boot code, cryptographic keys, firmware reference signatures, and tokens that are used to implement security protocols utilized by IHS 100.

As illustrated, processor(s) 101 may also be coupled to a network controller 125, such as provided by a Network Interface Controller (NIC) that is coupled to the IHS 100 and allows the IHS 100 to communicate with other systems, such as other IHSs similarly configured to IHS 100, via an external network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In some embodiments, network controller 125 may be instrumented with a controller or other logic unit that supports a sideband management connection 185b with remote access controller 155. In some instances, capabilities supported by network controller 125 are not directly available to workspaces operating on IHS 100 due to the isolation of these workspaces from certain hardware and software of the IHS.

Chipset 103 may also support communications with one or more display device(s) 115 via graphics processor 170. In certain embodiments, graphics processor 170 may be comprised within one or more video or graphics cards or an embedded controller installed as components of the IHS 100. Graphics processor 170 may generate display information and provide the generated information to one or more display device(s) 115 coupled to IHS 100, where display device(s) 115 may include integrated display devices and/or external display devices coupled to IHS. In certain embodiments, some or all of the functions supported by graphics processor 170 may be integrated within processor 101. The one or more display devices 115 coupled to IHS 100 may utilize LCD, LED, OLED, or other thin film display technologies. Each display device 115 may be capable of touch input such as via a touch controller that may be a component of display device 115, graphics processor 170, or a separate component of IHS 100 accessed via bus 103. In some instances, capabilities supported by graphics processor 170 are not directly available to workspaces operating on IHS 100 due to the isolation of these workspaces from certain hardware and software of the IHS.

In certain embodiments, chipset 103 may utilize one or more I/O controllers 150 to access various I/O hardware components such as user input devices and sensors. For instance, I/O controllers 150 may provide access to user-input devices such as a keyboard, mouse, touchpad, touchscreen and/or other peripheral input devices. User input devices may interface with a I/O controller 150 through wired or wireless connections. Sensors accessed via I/O controllers 150 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). In some instances, sensor capabilities supported are not directly available to workspaces operating on IHS 100 due to the isolation of these workspaces from certain hardware and software of the IHS.

In some embodiments, the data inputs collected by such sensors may be received by sensor hub capable of utilizing this information in determining various physical characteristics of the location and manner in which IHS 100 is being utilized. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or by a network interface. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing the integrated display 115.

Chipset 103 also provides processor(s) 101 with access to one or more storage devices 130. In various embodiments, a storage device 130 may be integral to the IHS 100, or may be external to the IHS 100. In certain embodiments, storage device 130 may be accessed via a storage controller that may be an integrated component of the storage device. Storage device 130 may be implemented using any memory technology allowing IHS 100 to store and retrieve data. For instance, storage device 130 may be a magnetic hard disk storage drive or a solid-state storage drive. In some embodiments, storage device 130 may be a system of storage devices, such as a cloud drive accessible via network controller 125. In some embodiments, storage device 130 may be instrumented with a controller or other logic unit that supports a sideband management connection 185*d* with remote access controller 155. In some instances, data storage capabilities supported by storage devices 130 are not directly available to workspaces operating on IHS 100 due to the isolation of these workspaces from certain hardware and software of the IHS.

IHS 100 may also include a BIOS (Basic Input/Output System) 135 component that may include instructions stored in a non-volatile memory that may be accessible by processor 101. The BIOS 135 provides an abstraction layer that allows an operating system of the IHS 100 to interface with the hardware components of the IHS 100. Accordingly, BIOS 135 provides an abstraction layer to the firmware utilized by various hardware components of IHS 100. In some embodiments, BIOS 135 may be implemented using a dedicated microcontroller coupled to the motherboard of IHS 100. In some embodiments, some or all of BIOS 135 may be implemented as operations of an embedded controller, such remote access controller 155. Upon powering or restarting IHS 100, processor(s) 101 may utilize BIOS 135 to initialize and test various hardware components of the IHS 100. Upon successful validation of these hardware components, in some embodiments, BIOS 135 may also initiate loading of an operating system for use by the IHS 100. As illustrated, BIOS 135 may be instrumented with a controller or other logic unit that supports a sideband management connection 185*c* with remote access controller 155. In certain embodiments, this sideband management connection 185*c* may be utilized by remote access controller 155 to identify communication capabilities that are supported by IHS 100 and that may be used in support of secure communications by workspaces operating on IHS 100.

As illustrated, IHS 100 may also include a power supply unit 160 that provides the hardware components of IHS 100 with appropriate levels of DC power. Power inputs received via a power port or via USB ports may be routed to the power supply unit 160 of IHS 100. The power inputs received by power supply unit 160 may be used in powering the operations of IHS 100 and in recharging internal batteries of IHS 100. In some embodiments, power supply unit 160 may support power outputs drawn from the internal batteries of IHS 100 and provided to external devices coupled to IHS 100, such as USB devices coupled to USB ports of IHS 100. In some embodiments, power supply unit 160 may provide power to components of IHS 100 using multiple independent power planes. For instance, as described below, remote access controller 155 may be powered from a separate power plane from processor 101.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 155 may operate from a different power plane from processors 101, storage devices 130, network controller 125 and various other components of IHS 100, thus allowing the remote access controller 155 to operate, and management tasks to proceed, while the processing cores of IHS 100 are powered off. In some embodiments, various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may support monitoring and administration of various managed devices 101, 120, 125, 130, 135 of an IHS via a sideband bus interface. For instance, messages utilized in device management may be transmitted using I2C sideband bus connections 185*a-e* that may be individually established with each of the respective managed devices 101, 120, 125, 130, 135 through the operation of an I2C multiplexer 155*a* of the remote access controller. As illustrated, managed devices 125, 130, 135 of IHS 100 are coupled to the IHS processor(s) 101 via one or more in-band buses supported by chipset 103, where these in-band busses are separate from the I2C sideband bus connections 185*b-d* used for device management. Accordingly, managed devices 125, 130 and 135 communicate with the operating system of IHS 100 via in-band buses supported by chipset 103, while the sideband buses 185*b-d* are used by managed devices exclusively for communications with remote access controller 155.

In certain embodiments, a service processor 155*d* of remote access controller 155 may rely on an 120 co-processor 155*c* to implement sideband 120 communications between the remote access controller 155 and managed components 101, 120, 125, 130, 135 of the IHS. The 120 co-processor 155*c* may be a specialized co-processor or micro-controller that is configured to interface via a sideband 120 bus interface with the managed hardware components 101, 120, 125, 130, 135 of IHS. In some embodiments, the 120 co-processor 155*c* may be an integrated component of the service processor 155*d*, such as a peripheral system-on-chip feature that may be provided by the service processor 155*d*. Each 120 bus 185*a-e* is illustrated as single line in FIG. 1. However, each 120 bus 185*a-e* may be comprised of a clock line and data line that couple the remote access controller 155 to 120 endpoints 101, 120, 125, 130, 135 on each of the managed components.

As illustrated, the 120 co-processor 155*c* may interface with the individual managed devices 101, 120, 125, 130, 135 via individual sideband 120 buses 185*a-e* selected through the operation of an 120 multiplexer 155*a*. Via switching operations by the 120 multiplexer 155*a*, a sideband bus connection 185*a-e* may be established through a direct coupling between the 120 co-processor 155*c* and each of the individual managed devices 101, 120, 125, 130, 135. In providing sideband management capabilities, the 120 co-processor 155*c* may interoperate with corresponding endpoint 120 controllers that implement the 120 communications of the respective managed devices 101, 120, 125, 130, 135. The endpoint 120 controllers may be implemented as dedicated microcontrollers for communicating sideband 120 messages with the remote access controller 155, or endpoint 120 controllers may be integrated SoC functions of a processor of the respective managed device endpoints 101, 120, 125, 130, 135.

In some embodiments, remote access controller 155 may perform various operations in support of the delivery and deployment of workspaces to IHS 100. In certain embodiments, remote access controller 155 may interoperate with a remote orchestration service via the described out-of-band communications pathways that are isolated from the operating system that runs on IHS 100. In some embodiments, a network adapter 155*b* that is distinct from network controller 125 utilized by the operating system of IHS 100 may support such out-of-band communications between remote access controller 155 and a remote orchestration service. Via this out-of-band signaling pathway, remote access controller 155 may receive authorization information that may be used for secure delivery and deployment of a workspace to IHS 100 and to support secure communication channels between deployed workspaces and various capabilities supported by IHS 100, while still maintaining isolation of the workspaces from the hardware and operating system of IHs 100.

In some embodiments, authorization and cryptographic information received by remote access controller 155 from a remote orchestration service may be stored to secured memory 120. As illustrated in FIG. 1, in some embodiments, remote access controller 155 may access secured memory 120 may via an 120 sideband signaling pathway 185*a* between 120 multiplexer 155*a* and an 120 communication capability supported by secure memory 120. Remote access controller 155 may support execution of a trusted operating environment that supports secure operations that are used to deploy a workspace on IHS 100. In certain embodiments, remote access controller 155 may calculate signatures that uniquely identify various hardware and software components of IHS 100. For instance, remote access controller 155 may calculate hash values based on instructions and other information used to configure and operate hardware and/or software components of IHS 100. For instance, remote access controller 155 may calculate a hash value based on firmware and on other instructions or settings of a component of a hardware component. In some embodiments, hash values may be calculated in this manner as part of a trusted manufacturing process of IHS 100 and may be stored in the secure storage 120 as reference signatures used to validate the integrity of these components at a later time. In certain embodiments, a remote orchestration service supporting the deployment of workspaces to IHS 100 may verify the integrity of the remote access controller 155 in a similar manner, by calculating a signature of remote access controller 155 and comparing it to a reference signature calculated during a trusted process for manufacture of IHS 100.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
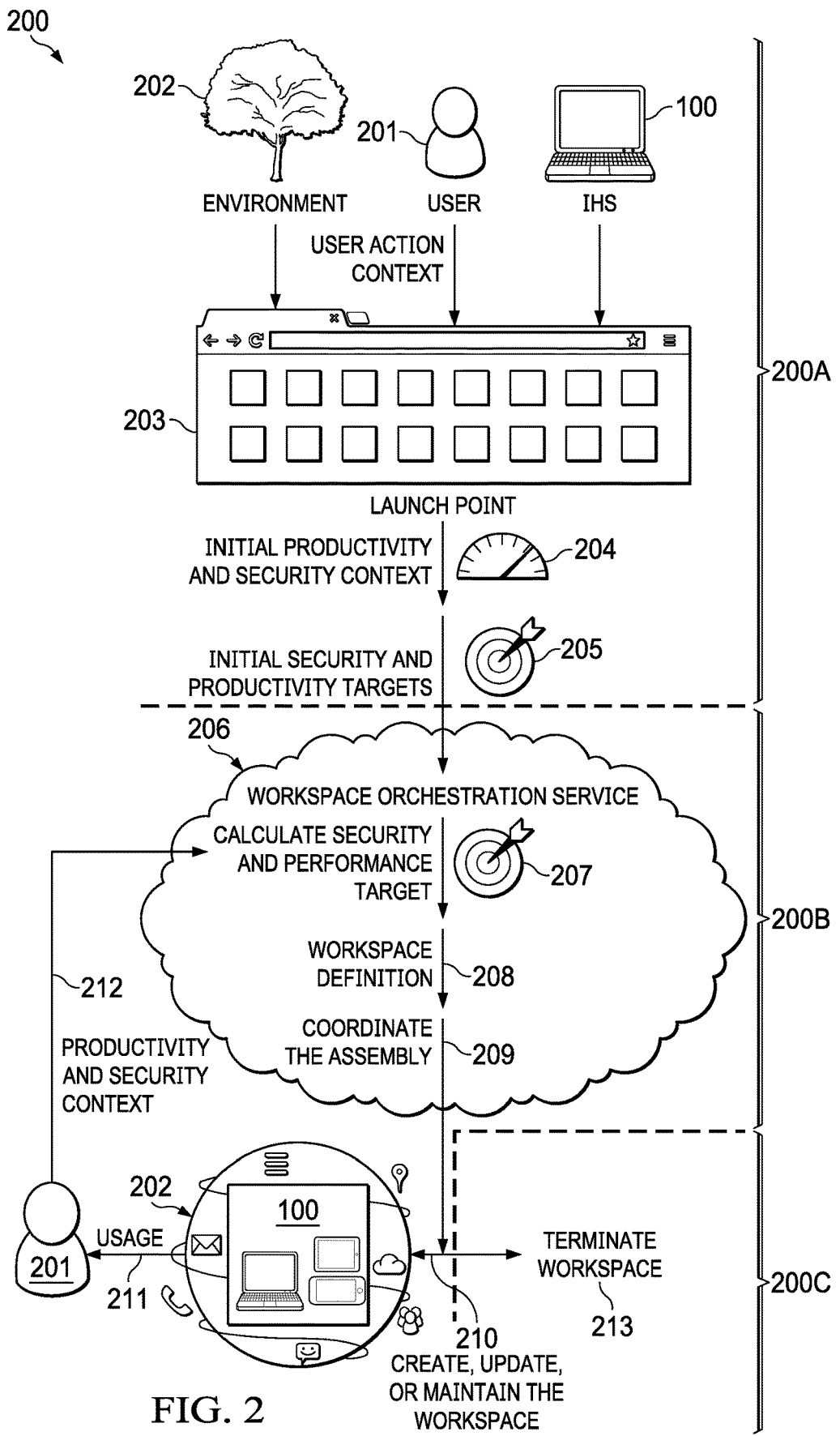
FIG. 2 is a diagram depicting illustrative embodiments of methods and system for deployment and management of workspaces on an IHS in a manner that supports secure use of resources of an IHS by workspaces operating on the IHS.

FIG. 2 is a diagram depicting illustrative embodiments of methods and system for deployment and management of workspaces on an IHS in a manner that supports secure use of resources of an IHS by workspaces operating on the IHS. For sake of explanation, the workspace lifecycle supported by embodiments has been split into three phases: workspace initialization phase 200A, workspace orchestration phase 200B, and workspace termination phase 200C. During initialization 200A, user 201 operates an IHS 100, such as described with regard to FIG. 1, within a physical environment 202 (e.g., any type of environment and its associated context, including physical location, geographic location, location within a particular facility or building, detected networks, time of day, proximity of the user, individuals in the vicinity of IHS 100, etc.).

The illustrated method for the workspace lifecycle according to embodiments may be initiated with an action by user 201 at a user interface that serves as a launch point 203 for initiating a workspace. In various instances, launch point 203 may be a corporate launch point provided by an employer of user 201, a manufacturer launch point provided by the manufacturer of IHS 100, or a third-party launch point provided as a service to user 201 by a third-party. In various instances, user 201 may operate IHS 100 to access a launch point 203 that is provided in the form of a web portal, a portal application running in the operating system of IHS 100, or a special-purpose portal workspace operating on IHS 100. In various embodiments, launch point 203 may be implemented using graphical, textual and/or audio interfaces by which data or other resource may be requested by a user 201. In various implementations, launch point 203 may include Graphical User Interface (GUI) elements, such as icons, that represent different software applications, data sources and/or other resources that the user may select for use via a workspace. As such, launch point 203 may provide a user with an ability to request initiation of a workspace that process access to software applications and data sources that are available to the user 201.

As described in additional detail below, workspaces for providing user 201 with access to protected data or other resources may operate using a local management agent 332 that operates on IHS 100 and is configured to interoperate with workspace orchestration service 206. As described, launch point 203 may be provided in the form of a portal (e.g., a webpage, OS application or special purpose workspace) that includes a user interface that allows user 201 to request access to managed resources. In some embodiments, launch point 203 may be hosted by the local management agent 332 that runs on IHS 100 and interoperates with remote workspace orchestration service 206. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source that is managed by the workspace orchestration service 206. In response to an access request issued by user 201 (e.g., the user "clicks" on an icon presented by launch point 203), at 204, local management agent 332 of IHS 100 collects initial security context information and productivity context information. In various embodiments, the security context information of a workspace may include attributes indicating a security risk associated with: the data and/or application being requested, a level of risk presented by the user 201, the hardware of the IHS 100, the logical software environment of IHS 100 in which a workspace will be deployed, and the physical environment 202 in which IHS 100 is currently located. Accordingly, in this disclosure, a "security context" generally refers to data or other information related to a security posture in which a workspace will be deployed and utilized, where the security posture may be based on characteristics of user 201, IHS 100, the data and/or application to be accessed via the workspace, and/or environment 202. In some embodiments, a security context may be quantified as a security risk score in support of evaluations of the level or risk associated with providing user 201 access to requested data and/or application while using IHS 100 in the particular context.

In various embodiments, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the operating system and other applications in use on IHS 100, availability of encryption, type of available encryption, access to secured storage, use of attestable hardware by IHS 100, and supported degree of workspace isolation by IHS 100.

In this disclosure, "productivity context" generally refers to user 201 productivity associated with a workspace, user 201, IHS 100, and/or environment 202. A "productivity score" generally refers to an index usable to score, quantify, or measure various productivity characteristics of a productivity context. Examples of productivity context information may include, but are not limited to: the hardware of the IHS 100 that is available for use in support of a workspace, the software of the IHS 100 that is available for use in support of the workspace, power states of IHS 100 and/or hardware components of IHS 100, maximum clock frequencies of hardware components of IHS 100 that can currently be supported, maximum operating speeds of software components of IHS 100, peripheral devices coupled to IHS 100 and networks available for use by IHS 100 in supporting the workspace.

Initial productivity and security targets for a workspace may be calculated, at 205, based on the context of user's 201 actions combined with the productivity and security context in which the workspace will operate. In some cases, at 205, a local management agent 332 operating on IHS 100 may calculate initial security and productivity targets based upon the collected security and productivity context. In other cases, remote workspace orchestration service 206 may calculate security and productivity targets for a workspace. In this disclosure, "security target" generally refers to the attack surface presented by a workspace that is created and operated based on a specific workspace definition, while "productivity target" generally refers to the productivity characteristics of a specific workspace definition. Examples of a productivity target characteristics include, but are not limited to: types of data or data sources available to user 201 within a workspace, latency of the workspace, software applications available within the workspace, responsiveness of the workspace and remaining computational overhead available to the workspace. Attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces and the ability to extend a workspace. In some instances, productivity and security targets may also be based on user's 201 behavioral analytics, IHS 100 telemetry and/or environmental information that is collected via sensors of IHS 100.

In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of the security context (e.g., location, patch level, threat information, network connectivity, etc.) and the productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 that is configured for operation with the workspace orchestration service 206.

In specifying capabilities and constraints of a workspace, a workspace definition 208 may prescribe one or more of: authentication requirements for user 201, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), and workspace capabilities available to independently attach other resources.

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during an orchestration phase 200B of workspace deployment, at 208, the initial security and productivity targets are processed and/or reconciled against resources, IHS capabilities, and cloud services capabilities in order to produce a workspace definition. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace, applications to be provided for operation within the workspace, aggregation of resources available via the workspace, configurations for accessing data or resources (e.g., required use of a virtual private network (VPN)).

As described in additional detail with regard to FIG. 3, the initial workspace definition may then be utilized by an automation engine 302 of workspace orchestration service 206 to coordinate the assembly 209 and instantiation 210 of a workspace on an appropriate platform (e.g., on the cloud, on IHS 201, or some combination of the two) based on the security and productivity contexts in which the workspace will operate. In some embodiments, automation engine 302 may resolve configuration conflicts between a workspace definition and the user's inputs in the operation of a workspace. In cases where a workspace is cloud-hosted, the automation engine 302 may assemble and instantiate a remote workspace that may be accessed via a secure connection established via a web browser or other web-based component operating on the IHS 100.

At 211 of FIG. 2, the instantiated workspace is operated by user 201 and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation, at 207, of the security and performance targets by automation engine 302. Additionally or alternatively, a new workspace context, security target, and/or productivity target may be now measured against the initial targets, and the result may cause automation engine 302 to produce a new workspace definition at 208.

Particularly, if the instantiated workspace(s) have security or productivity parameters that fall outside of a range of the target scores for these parameters such that a difference between an updated context information and the previous context information is scored below a threshold value, automation engine 302 may generate modifications to an existing workspace and, at 210, may deploy an updated workspace according to the modified definition. Conversely, if the difference between an updated context information and the previous context information is scored above a threshold value, automation engine 302 may generate a new workspace at 210. Session data metadata and context may be preserved by data aggregation engine 336, and session data may be restored in the new workspace as applicable.

Various conditions may trigger termination of a workspace at 213, as part of termination phase 200C. In some cases, user action may initiate the termination of a workspace (e.g., user 201 closes application or browser accessing data). In other cases, termination of a workspace may take place automatically as part of an adjustment in workspace definition (e.g., the workspace is terminated by automation engine 302 in order to support a new or updated workspace). As part of a termination phase 200C of a workspace, various workspace resources of IHS 100 and/or at workspace orchestration service 206 may be released.

Figure 3A:
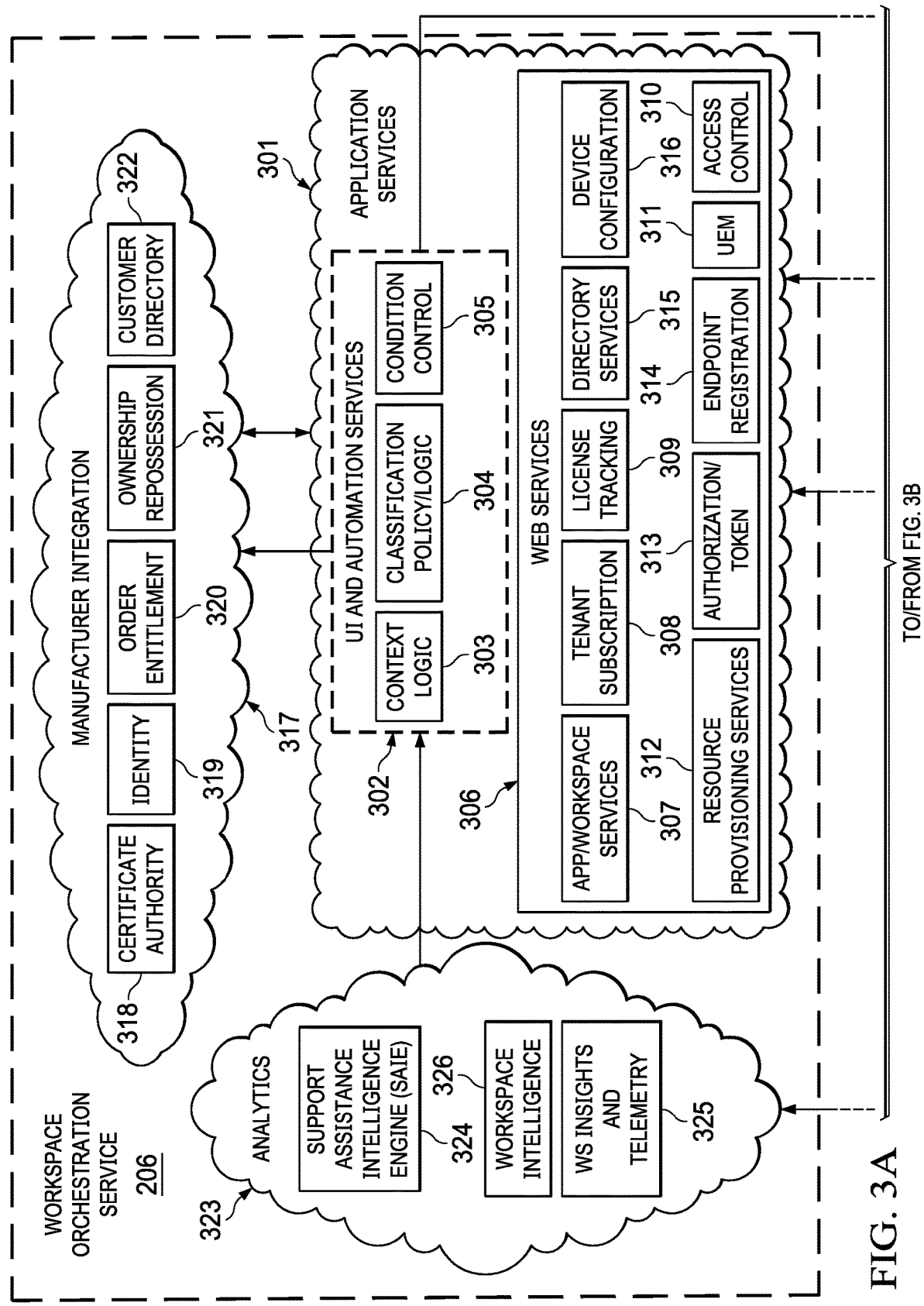
FIGS. 3A and 3B are diagrams depicting an illustrative system configured according to embodiments for deployment and management of workspaces on an IHS in a manner that supports secure use of resources of the IHS by workspaces operating on the IHS, and for managing graphics processor usage by those workspaces.
Figure 3B:
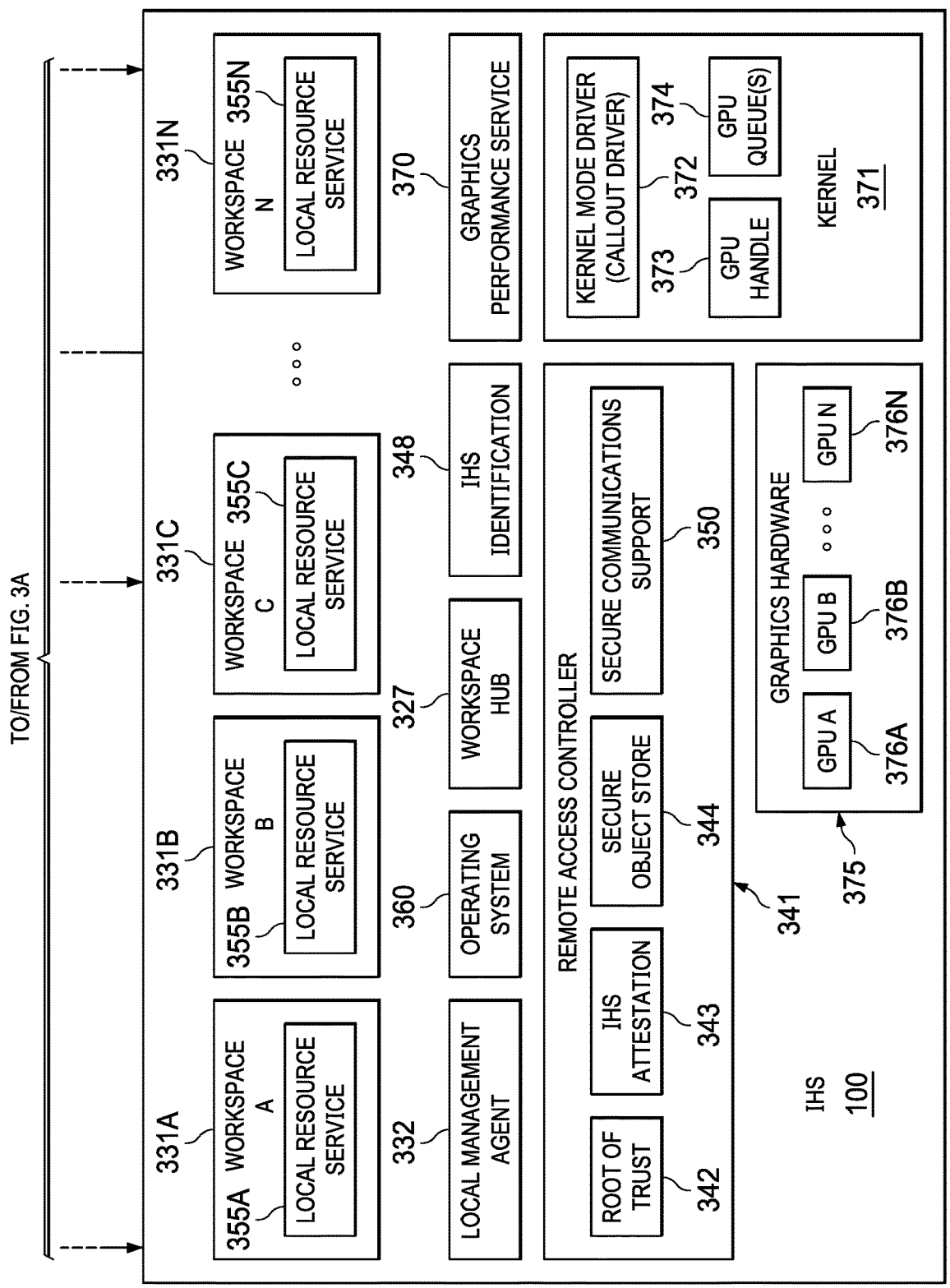

FIGS. 3A and 3B are diagrams depicting illustrative embodiments of a system for deployment and management of workspaces on an IHS 300B in a manner that supports secure use of resources of the IHS by workspaces operating on the IHS. The illustrated system includes a workspace orchestration service 206 that performs various workspace orchestration operations described above, such as: the evaluation of security and productivity targets based upon context information, the calculation of risk scores and other productivity and security metrics based on ongoing collection of context information, the generation of workspace definitions, and the assembly and instantiation of workspaces in accordance with a workspace definition, where the workspaces may be instantiated via a cloud service or an IHS 100, such as described with regard to FIG. 1 and further described with regard to FIG. 3B. As described, IHS 100 may supported deployment and operation of workspaces through the collection of productivity and security context information, the calculation of productivity scores and/or risk scores, the instantiation, execution, and modification of a workspace based upon workspace definitions that are received from workspace orchestration service 206.

Workspace orchestration service 206 and IHS 100 may be coupled to each other via any suitable network technology and/or protocol which allows workspace orchestration service 206 to interoperate with IHS 100. As described with regard to FIG. 1, an IHS 100 according to embodiments may include a component such as a remote access controller 155 that may support secure out-of-band communications that are independent from the operating system of IHS 100. In some embodiments, such a remote access controller may be configured to utilize such out-of-band communication capabilities to support deployment and operation of workspaces on IHS 100 and to report changes in context information to the workspace orchestration service 206.

As illustrated in FIG. 3A, workspace orchestration service 206 may include a number of sub-components that support deployment and ongoing evaluation and adaptation of workspaces on an IHS 100. Embodiments of the workspace orchestration service 206 may include systems that may support web services 306, manufacturer integration 317, and analytics 323. As illustrated, web services 306 may, in turn, comprise application services 301 and user interface (UI) and automation services 302. In some embodiments, analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, performance measurements, use of features, settings, etc.) resulting from the operation of workspaces. Workspace intelligence 326 may include an intelligence engine for processing and evaluating context data in order to identify patterns and tendencies in the operation of workspaces and in the adaptation of workspaces based on context changes.

As illustrated, an application services 306 system of the workspace orchestration service 206 may include a UI and automation services 302 system that may include context logic engine 303, classification policy logic 304, and condition control engine 305. Context logic engine 303 may support processing of context information in making risk assessments (e.g., evaluating the risk associated with requests by the user against the context of the user's behavior, history of the use of IHS 100, capabilities of IHS 100, and environmental conditions). For instance, security context information collected by IHS 100 may be provided to workspace orchestration service 206 where it may be used by context logic 303 to calculate a risk score associated with a request for use of a managed data source and/or application. Classification policy 304 may include administrator and machine-learning defined policies describing risk classifications associated with different security contexts, such as risk classifications associated with specific data, locations, physical environments, IHSs, logical environments, and user actions (e.g., use of high-risk data requires use of a workspace definition suitable for use with a risk score above a specific value). Condition control engine 305 may include intelligence providing automated decision making for alignment of risk and context. In some cases, condition control engine 305 may dynamically deploy a solution to address any detected misalignment of risk and context. For instance, upon requesting access to a highly classified data source that results in a significant increase in risk score, the condition control engine may select workspace definition modifications that implement security procedures that are suitable for the higher risk score.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container). In some embodiments, a workspace definition may be used to specify various such types of workspace deployments that will be used to provide a user with access to an application. Web services 306 may also include a tenant subscription module 308, that performs dynamic configuration of an IHS 100 for use with the described workspace orchestration services 206 at the point-of-sale (POS) of the IHS. A license tracking module 309 may be used to maintain and track license information for software, services, and IHSs. An access control module 310 may provide top level access controls used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces deployed on IHS 100 may further include resource provisioning services 312 for configuring IHS 100 or a workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned to IHS 100, such as to secure memory 120, as part of a trusted assembly process of IHS 100 and, in some instances, associated with a unique identifier 348 of the IHS 100. Web services 306 may also include an authorization/token module 313 that provides identity functions and may connect to various authentication sources, such as Active Directory. Endpoint registration module 314 may be configured to register IHSs and/or workspaces in order to track the use of the described workspace orchestration. In some scenarios, a directory services 315 module may be configured to provide active directory services (e.g., AZURE ACTIVE DIRECTORY from MICROSOFT CORPORATION). Device configuration services 316 may enable central configuration, monitoring, managing, and optimization of workspaces that in certain contexts may operate remotely from an IHS and may only present the user of the IHS with a user interface that presents an image of the workspace output. In cooperation with resource provisioning services 312, device configuration services 316 may also handle creation of secrets and IHS configuration.

Still referring to FIG. 3A, manufacturer integration components 317 communicate with application services 301 and client IHS 100 to provide features that are usable during workspace evaluation and instantiation, where these features may be based upon information available to the manufacturer of IHS 100. For instance, certificate authority 318 may include an entity that issues digital certificates that may be used in validating the authenticity and integrity of the hardware of IHS 100. Identity service module or engine 319 may be configured to manage the user identities, as well as brokering user identification for use of customer directory 322. Order entitlement engine 320 may be used to manage purchased entitlements as well as the associated issued certificates signed by 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to IHS 100 of FIG. 3B, in some embodiments, IHS 100 may be configured to operate a local management agent 332 that may operate as a trusted and attestable process of IHS 100 and that may operate independent from the operating system 360 of IHS 100. In some embodiments, local management agent 332 may include a workspace engine that instantiates and manages the operation of one or more workspaces 331A-N on IHS 100. As described, the capabilities of a workspace 331A-N may be modified based on detected changes in the productivity and security contexts in which the workspace is operating. Accordingly, the workload(s) in each of the workspaces 331A-N may be hosted in full or in part by a cloud resource, a specific server, or locally hosted on IHS 100, depending on the context in which the workspace is operating. These allocations of workspace computing for each particular workspace 331A-N may be prescribed by the workspace definition that is used to build and operate each workspace. As described, the workspace definition may be created by workspace orchestration service 206 based upon: context information provided by IHS 100, security targets for each workspace 331A-N, and/or productivity targets for each workspace 331A-N. As described in additional detail below, an individual workspace 331A-N may be provided with use of local resources of IHS 100 via a secure communication mechanism supported by workspace orchestration service 206 and remote access controller 341 of IHS 100. Utilizing the provided embodiments, such use of local resources by workspaces 331A-N may be adapted in response to detected changes in the security context of IHS 100.

In some embodiments, local management agent 332 may be configured to host, launch, and/or execute a workspace hub 327 that provides a launch point 203 by which users may initiate workspaces 331A-N through the selection of managed data and/or resources. As described, launch point 203 may be an agent, application, special-purpose workspace or web portal the provides a user interface by which a user may select from a collection of data sources, applications or other managed information or resources that are available to the user of IHS 100 via the operation of a workspace as described herein. In various embodiments, launch point 203 may be provided in the form for textual, graphical and/or audio user interfaces that allow a user of IHS 100 to select available data and/or resources. Workspace hub 327 may utilize a local environment management module in providing the workspace interface that is presented to the user on IHS 100 in a consistent manner across workspaces 331A-N.

In some embodiments, each instantiated workspace 331A-N may be a logical software environment that provides a user with access to requested data or applications, where the environment may be isolated in varying degrees from the hardware and software of IHS 100 based on the security context and productivity context in which each workspace 331A-N is operating. In some instances, the selection of a data source or resource that is available to user via launch point 203 may result in launching a new workspace 331A-N. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user selects a confidential presentation file available from a data source that is provided by launch point 203, an additional workspace 331A-N may be instantiated with use of a presentation application and with access to the requested presentation file, where this new workspace is created based on a workspace definition that provides appropriate security for access to the confidential presentation. In other instances, a selection of the presentation file by a user may result in the presentation being made available through the existing workspace, in some cases using the existing workspace definition and, in other cases, using a workspace definition that has been modified to support the requested access to the confidential presentation file.

In various embodiments, in order to execute the various operations described herein, local management agent 332 may include a command monitor that provides instrumentation to receive commands from workspace orchestration service 206 in support of adaptation of workspaces 331A-N based on detected changes in context. Local management agent 332 may include a telemetry module that may collect and communicate information to the workspace orchestration service 206, including reporting changes in context that may warrant adjustments to workspaces 331A-N. Local management agent 332 may also utilize a resource manager module that is configured to manage access to data, network configuration, such as for VPNs and network access, identity information, access control, and resource provisioning services. A security module of local management agent 332 may be configured to provide various security services. IHS 100 may include an IHS identification module 348 that provides a unique, unspoofable identifier that is cryptographically bound to IHS 100.

As illustrated in FIG. 3B, IHS 100 includes a remote access controller 341 that provides capabilities for remote management of IHS 100 and that provides out-of-band management of various hardware components of IHS 100. As indicated in FIG. 3B, the remote access controller 341 operates independently from the operating system 360 in providing remote management of IHS 100. A selected portion of the capabilities of a remote access controller 341 are illustrated in FIG. 3B. As described with regard to FIG. 1, a remote access controller 341 may include a root of trust 342 capability that is used to evaluate firmware instructions to be used by various hardware components of IHS 100 against reference signatures for these components, thus validating the firmware in use by these components. In some embodiments, workspace operations supported by workspace orchestration service 206 may require such root of trust validations by remote access controller 341 prior to initiating deployment of workspaces to IHS 100. In some embodiments, remote access controller 341 may include a secure object store 344 for use in storing reference signatures used by root of trust 342 module. As described with regard to FIG. 1, reference signatures utilized by root of trust 342 module may alternatively or additionally be stored in a secure memory of IHS 100. In some embodiments, an IHS attestation 343 module of remote access controller 341 may interface with workspace orchestration service 205 in providing confirmations of root of trust validations of the hardware components of IHS 100.

In some embodiments, remote access controller 341 may also include a secure communications support module 350 that may be used to facilitate secure communications with workspaces 331A-N in providing these workspaces with access to local resources of IHS 100 that have been registered for use in this manner with workspace orchestration service 206. As described in additional detail below, configuration of a local resource for use by a workspace 331A-N may include workspace orchestration service 206 providing remote access controller 341 with a handle for use in interfacing with an individual workspace 331A-N in providing the workspace with a selected local resource of IHS 100. As described, an IHS may concurrently support multiple different workspaces 331A-N, each operating according to a separate workspace definition. Each workspace 331A-N may utilize multiple local resources of IHS 100. Each instance of a workspace utilizing a local resource of IHS 100 may be supported by a separate handle that supports secure communications between a workspace and the remote access controller 341. In turn, each handle may include a token and may specify various conditions for the validity of the token, such as a time limit on the validity of a token. The secure communications support module 350 of the remote access controller 341 may manage the various handles in use at any one time in providing workspaces 331A-N with access to local resources of the IHS. In some embodiments, secure communications support module 350 may be configured to evaluate the conditions provided in each handle for the validity of the handle's token in order to determine whether to continue providing a workspace with access to the local resource specified by the handle.

As illustrated, each workspace 331A-N may include a local resource service 335A-N that configures use of available resources of the IHS by a respective workspace. As described in additional detail below, a local resource service 355A-N may interoperate with workspace orchestration service 206 in order to configure a respective workspace 331A-N for use of resources of the IHS 100 that have been registered with the workspace orchestration service 206 as being available for use by workspaces 331A-N. In some instances, such resource of IHS 100 that are available for use by workspaces 331A-N may be identified for workspace orchestration service 206 by remote access controller 341 via out-of-band signaling pathways that are independent from operating system 360 of IHS 100, such as described with regard to FIG. 1. Once a local resource service 355A-N has negotiated use of available IHS resources, workspace orchestration service 206 may provide a respective local resource service 355A-N with a handle that supports a secure mechanism for accessing a local resource of IHS 100, as supported by a remote access controller 341 of the IHS 100.

Still referring to FIG. 3B, graphics performance service 370 may be configured to perform methods for managing graphics processor usage by modern workspaces, for example, as discussed below in FIGS. 6-9. To that end, graphics performance service 370 may be in communication with each of plurality of workspaces 331A-N and/or with kernel mode driver 372 (e.g., a callout driver), for example, using method(s) for configuring and/or securely using resources of IHS 100 by workspaces 331A-N, as also described below in FIGS. 4 and 5.

Each of workspaces 331A-N may use kernel mode driver 372 to execute graphics calls or commands with respect to graphics hardware 375. In some cases, a single virtual GPU handle 373 may be used by each of workspaces 331A-N and/or kernel mode driver 372 to address all calls or commands; although graphics hardware 375 may itself include a plurality of discrete and/or integrated Graphics Processing Units (GPUs) 376A-N. When kernel mode driver 372 receives graphics calls or commands from each of workspaces 331A-N, it stores those calls in GPU queue(s) 374 (e.g., one queue for each GPU) prior to transmitting them to graphics hardware 375 for execution.

In various implementations, graphics performance service 370 may be configured to use kernel mode driver 372 to assign one or more GPUs 376A-N to selected workspaces 331A-N, to manage and/or re-prioritize GPU queue(s) 374, and/or to instruct local management agent 332 to run, stop, or migrate one or more workspaces 331A-N (and/or to outsource graphics services) to a remote server. For example, graphics performance service 370 may be configured to classify the graphics workload of applications within each of workspaces 331A-N and/or to use any suitable context information received from OS 360 for managing the usage of GPUs 376A-N. Examples of context information include, but are not limited to: IHS location, user presence and proximity, IHS posture (e.g., lid open or closed), connection to peripheral devices (e.g., external monitor), application identification (e.g., video conferencing, browser, etc.), type (e.g., real-time graphics requirement, etc.), or status (e.g., foreground or background), etc.

To collect context information, IHS 100 embodiments may utilize a sensor hub or the like capable of sampling and/or collecting data from a variety of hardware sensors. For instance, sensors may be disposed within IHS 100, and/or a display, and/or a hinge coupling a display portion to a keyboard portion of IHS 100, and/or a keyboard or other input device. Moreover, the IHS's processor may be configured to process information received from sensors through the sensor hub.

In some cases, sensors may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

For instance, during operation of IHS 100, the user may open, close, flip, swivel, or rotate the display to produce different IHS postures. In some cases, the processor may be configured to determine a current posture of IHS 100 using sensors. For example, in a dual-display IHS implementation, when a first display (in a first IHS portion) is folded against a second display (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display may be facing the user at an obtuse angle with respect to a second display surface of a second display or a physical keyboard portion. In a tablet posture, a first display may be at a straight angle with respect to a second display or a physical keyboard portion. And, in a book posture, a first display may have its back resting against the back of a second display or a physical keyboard portion.

It should be noted that the aforementioned postures, and their various respective keyboard states, are described for sake of illustration. In different embodiments, other postures may be used and detected, for example, depending upon the type of hinge coupling the displays, the number of displays used, or other accessories.

In other cases, the IHS's processor may process user presence data received by sensors and may determine, for example, whether an IHS's end-user is present or absent. Moreover, in situations where the end-user is present before IHS 100, the processor may further determine a distance of the end-user from IHS 100 continuously or at pre-determined time intervals. The detected or calculated distances may be used by the processor to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or a display.

More generally, in various implementations, the IHS's processor may receive and/or produce system context information using sensors including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100, etc.

Figure 4:
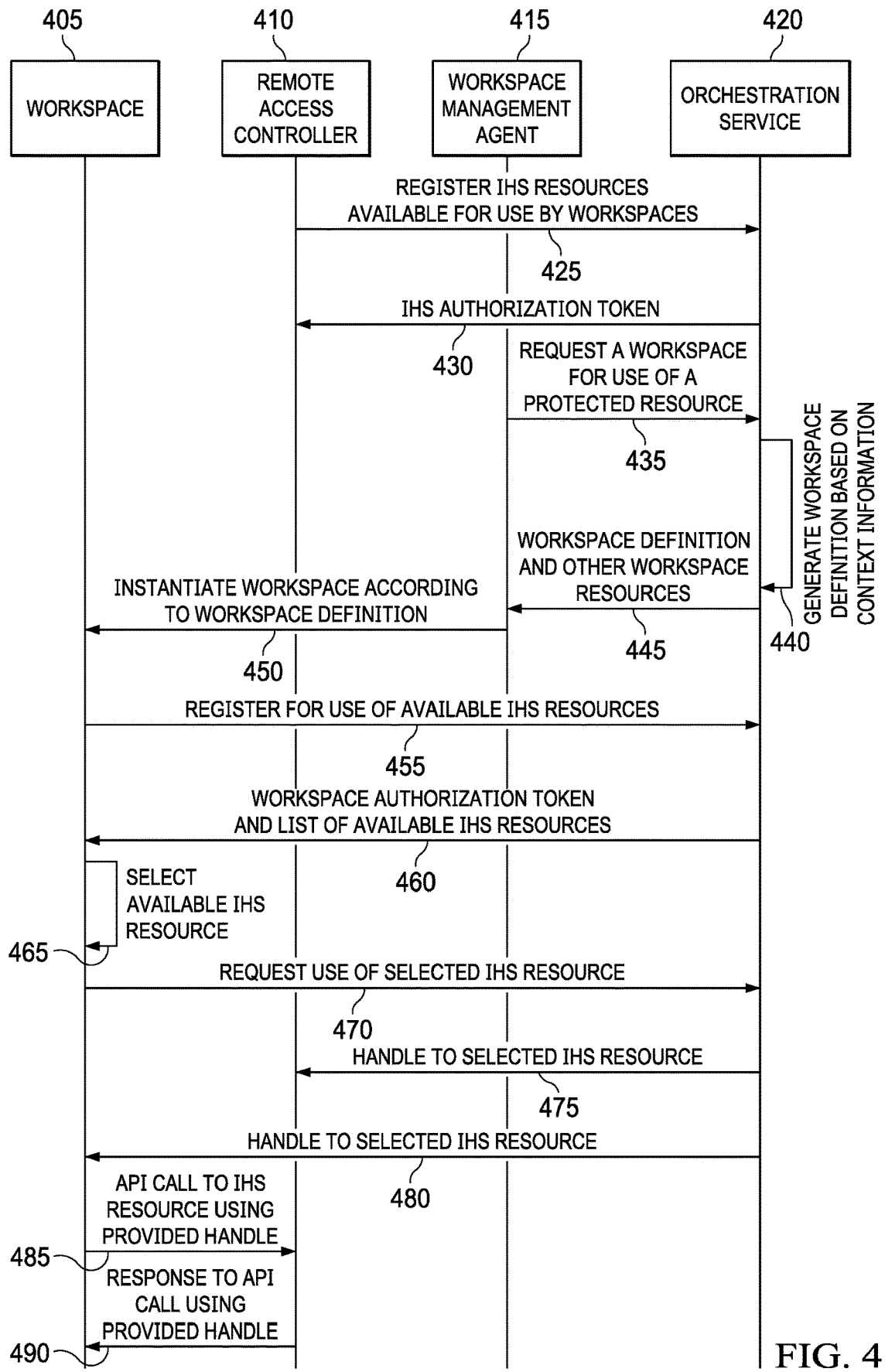
FIG. 4 is a swim lane diagram describing certain steps of a method, according to some embodiments, for secure use of resources of an IHS by workspaces operating on the IHS.
Figure 5:
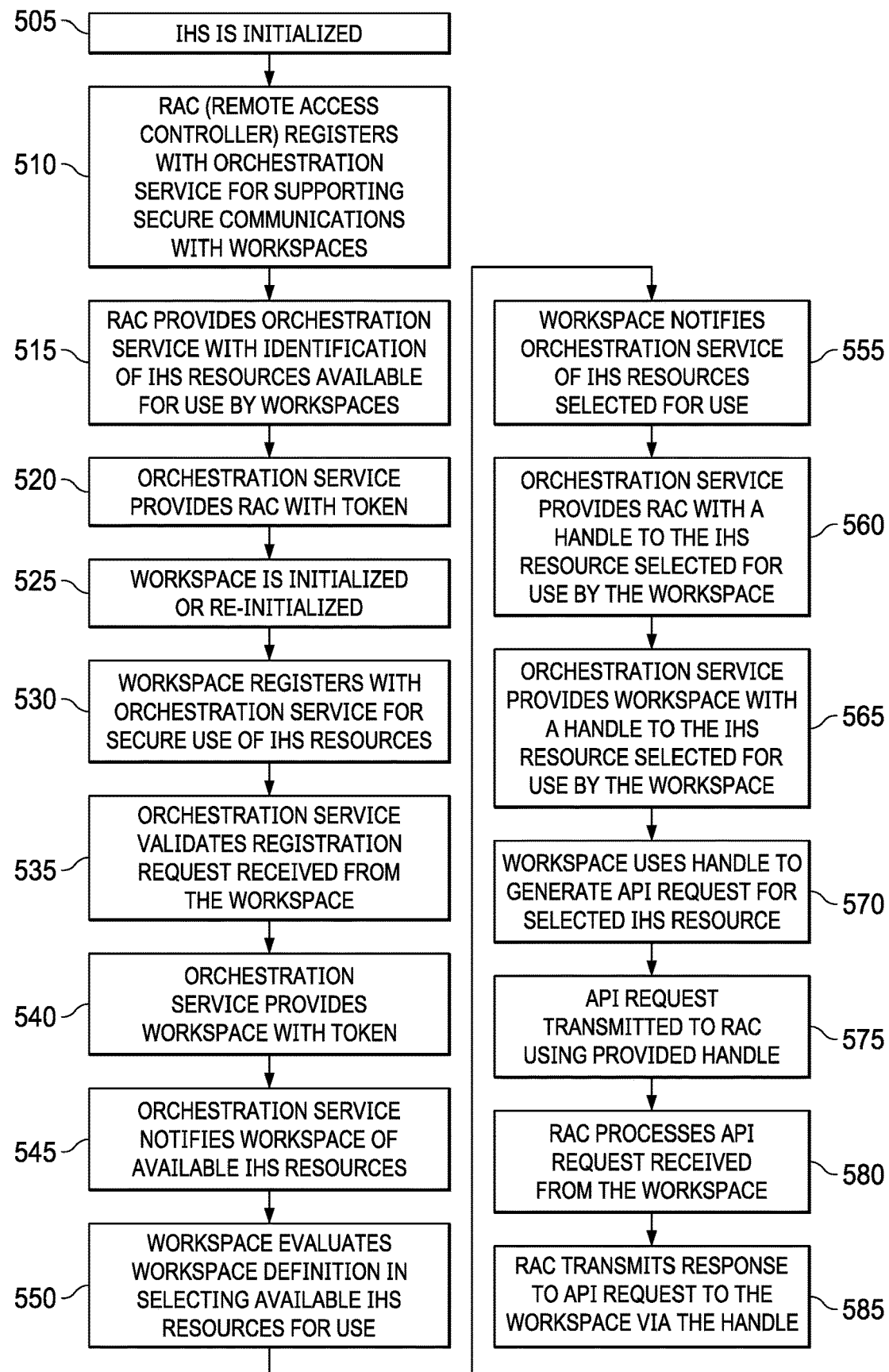
FIG. 5 is a flowchart describing the operation of certain components of a system, according to some embodiments, in configuring secure use of resources of an IHS by workspaces operating on the IHS.

FIG. 4 is a swim lane diagram describing certain steps of a method, according to some embodiments, for secure use of resources of an IHS by workspaces operating on the IHS. FIG. 5 is a flowchart describing the operation of certain components of a system according to some embodiments, in configuring secure use of resources of an IHS by workspaces operating on the IHS. As illustrated in FIG. 5, embodiments may begin with the initialization of an IHS that is configured according to the embodiments described above. As described, in some embodiments, initialization procedures of an IHS may include validation of instructions utilized by various hardware components of the IHS. For instance, firmware instructions to be loaded by a remote access controller 410 of the IHS may be used to generate a hash value that is compared to a digital signature stored in a secure memory of the IHS, where the digital signature corresponds to authentic firmware instructions stored for use by the remote access controller during a trusted manufacturing process of the IHS, or during another trusted administrative process. In this same manner, the firmware instructions utilized by various hardware components of the IHS may be successively validated against stored reference signatures in order to iteratively expand a root of trusted hardware components of the IHS. In some embodiments, the firmware instructions of the remote access controller 410 that are validated in this manner may include instructions used by the remote access controller to determine resources of the IHS that may be utilized by workspaces operating on the IHS and to transmit such local resource information to a remote workspace orchestration service 420.

As indicated at 425 in FIG. 4 and at 510 of FIG. 5, once the instructions utilized by the remote access controller 410 have been validated, the remote access controller may utilize these instructions to communicate with a remote workspace orchestration service 420 in registering for secure use of IHS resources by workspaces operating on the IHS. In some embodiments, the validated firmware instructions utilized by the remote access controller 410 may include instructions for securely determining resources of the IHS that may be used by workspaces operating on the IHS and for transmitting a registration of these available IHS resources to the workspace orchestration service 420. In such instances, the remote access controller 410 thus utilizes validated instructions for configuring operation with workspaces and in communicating with the workspace orchestration service 420, where these instructions are provided during a trusted process for manufacture of an IHS, or during a trusted administrative process.

At 515 of FIG. 5, the remote access controller 410 provides the workspace orchestration service 420 with a listing of IHS resources that are available for use by workspaces 405 operating on the IHS. As described, such list of available resources may include capabilities supported by hardware or software components of the IHS, but are not accessible to workspaces 405 due to their isolation from the underlying hardware and software of the IHS. For instance, available resources may include ACPI (Advanced Configuration and Power Interface) capabilities for querying and configuring power management settings of an IHS. In some instances, available resources may include VMI (Windows Management Instrumentation) capabilities for management of IHSs that operate using a Windows operating system. In some instances, available resources may include use of thread management, memory management or network controller functions that are not accessible by workspaces 405 due to virtualization of the hardware of the IHS. In some embodiments, available resources may support functions that consolidate services in use by different workspaces 405 operating on the IHS, such as consolidation of authentication capabilities in use by the workspaces or consolidation of VPN capabilities. Through the use of such consolidated functions, workspaces 405 may avoid duplicative operations and may also avoid possible inconsistencies that may result from each workspace 405 utilizing a resource of the IHS in isolation from each other.

As indicated at 520 of FIG. 5 and at 430 of FIG. 4, in response to receiving a list of available IHS resources, the workspace orchestration service 420 transmits an authorization token to the remote access controller 410. This authorization token may be used to establish secure communications between a workspace and the remote access controller 410 in providing the workspace with access to the available resources of the IHS. In some embodiments, the authorization token provided to the remote access controller 410 may be calculated based on a unique identifier of the IHS, such as an identifier provided by an IHS identification 348 function of IHS, where this unique identifier may be a service tag or other unique code assigned to IHS upon its manufacture. By generating the authorization token based on a unique identifier of IHS, the token is thus bound to that particular IHS such that any attempts to utilize the token by other IHSs are detectable.

In some instances, the identification of available resources by the remote access controller 410 and the receipt of an authorization token from the workspace orchestration service 420 is completed upon initialization of the remote access controller 410 and prior to the user commencing actual use of the IHS. Once the IHS has been initialized and is in use, at 525, a workspace may be initialized or reinitialized. In some instances, a workspace may be initialized in response to a user requesting access to a protected resource via a launch point operating on the IHS, such as described with regard to FIG. 2. As described with regard to FIGS. 3A and 3B, an IHS supporting the use of workspaces may operate using a workspace management agent, represented as 415 in FIG. 4, that is used to deploy and manage workspaces operating on the IHS.

In response to a user initiating a request for use of a protected resource through operation of a workspace, at 435, the workspace management agent 415 transmits a request for a workspace for use of the protected resource to the workspace orchestration service 420. At 440, the workspace orchestration service 420 generates a workspace definition for generating and operating a workspace that provides the user with access to the protected resource. As described above, a workspace definition may be selected based on factors such as the security context and productivity context of the IHS that will host the workspace, the user making the request and/or the logical and physical environment in which the workspace will operate. Various types of context information may be provided to the workspace orchestration service 420 as part of the request from the workspace management agent 415. Additional context information may be collected by the workspace orchestration service 420 from the remote access controller 410. Based on evaluation of the context information, at 445, the workspace orchestration service 420 transmits the workspace definition and other data for generating a workspace to the workspace management agent 415.

Using the received workspace definition, at 450, the workspace management agent 415 instantiates and deploys the workspace 405 that will provide the user with access to the protected resource. With the workspace 410 deployed and in use, at 450 of FIG. 4 and at 530 of FIG. 5, the workspace 410 registers a request for use of available IHS resources with the workspace orchestration service 420. As described with regard to FIG. 3B, each workspace 331A-N that is configured and deployed according to embodiments may include a local resource service 335A-N that is configured to provide a respective workspace with access to local resources of the IHS that are otherwise unavailable due to the isolation of the workspace from all or part of the hardware and software of the IHS. As described, a workspace may provide access to a protected resource within a virtualized logical environment that relies on abstractions from the underlying hardware and the operating system of an IHS, thus isolating the workspace from these local resources of the IHS.

Upon receipt of a registration request from workspace 405, at 455, the workspace orchestration service 420 responds by providing workspace 405 with a list of the available resources of the IHS that are available for use by workspaces, as specified, at 425, by the remote access controller 410. As indicated in FIG. 5, at 535, the workspace orchestration service 420 may validate the registration request received from workspace 405. In some embodiments, the workspace 405 may include a unique identifier in its registration request transmitted to the workspace orchestration service 420. In such instances, this unique identifier presented by the workspace 405 is an identifier that was included in the workspace definition that was generated by the workspace orchestration service 420 and used to deploy the workspace 405. By presenting this unique identifier in its registration request, the workspace orchestration service 420 may validate that the request originates from an authentic workspace that is operating using a workspace definition generated by the workspace orchestration service 420. Once the workspace 405 has been validated, at 540 and at 455, the workspace orchestration service 420 provides the workspace 405 with an authorization token for use in authenticating the workspace 405 and its use of IHS resources made available via the remote access controller 410. In some embodiments, the token provided to the workspace 405 may be calculated by the orchestration service 420 based on the unique identifier of the workspace, thus binding the token for use by that particular workspace such that any attempts to utilize the token by other workspaces are detectable.

As indicated at 455 of FIG. 4 and at 545 of FIG. 5, the workspace orchestration service 420 also provides the workspace 405 with the list of IHS resources that have been made available by the remote access controller 410 for use by workspaces. At 550, the workspace 405 may evaluate the list of available IHS resources against its workspace definition in order to determine the available IHS resources that are compatible with the operating constraints specified by the workspace definition. For instance, a required minimum security score associated with a workspace definition may prohibit the use of certain IHS resources. At 460, the workspace 405 selects from the list of available IHS resources based on compatibility with the workspace definition in order to gain access to IHS capabilities that are not otherwise available to workspace 405. At 465 of FIG. 4 and at 555 of FIG. 5, the workspace 405 notifies the workspace orchestration service 420 of its selection from the list of IHS resources that has been made available by the remote access controller 420 of the IHS.

In response to the selection of an IHS resource by workspace 405, at 560 and as indicated at 470, the workspace orchestration service 420 provides the remote access controller 410 with a handle to the requested IHS resource, where this handle specifies the IHS resource to be provided, a mechanism for invoking the IHS resource and any constraints that may limit the duration of the workspaces' use of the IHS resource. At 565 and as indicated at 475, this same handle may be provided by the workspace orchestration service 420 to the workspace 405 that has requested access to the local IHS resource. In some embodiments, the handle provided by the workspace orchestration service 420 may specify various aspects of the local IHS resource that is being made available to the workspace 405 by the remote access controller 410. In addition to identifying the resource, the handle may also specify an API (Application Programming Interface) that is to be supported by the remote access controller 410 for use by the workspace 405 in invoking the IHS resource. The API included in the handle may specifies as a list of methods that are supported by the remote access controller 410, where the specified methods may be identified by a signature that specifies method arguments that must be supplied by the workspace 405 and responses that will be provided by the remote access controller 410. For instance, if the local resource that is selected is use of ACPI power management functions, the API specified in the handle may list a set of method signatures that are supported by the remote access controller 410 in providing ACPI functionality to workspace 405.

In providing a mechanism by which the API included in the handle may be invoked, the handle may also include a reference to an IPC (Inter-Process Communications) resource of the IHS that is to be used in the API communications between the remote access controller 410 and the workspace 405. For instance, the handle may include a pointer to a memory location or data buffer that is to be used in the transmission of data between the remote access controller 410 and the workspace 405. In other instances, the handle may include a reference identifying a socket or pipe by which data may be transmitted by a workspace 405 to the remote access controller 410 and by which responsive data resulting from execution of an API call may be provided to the workspace 405 by the remote access controller 410.

In addition to specifying the API that is supported and a reference to an IPC resource of the IHS, the handle provided by the workspace orchestration service 420 may also include a token that may be used to specify constraints on the duration of the validity of the handle. In some embodiments, the token included in a handle may be generated based on the token provided to the remote access controller 410, which may be based on a unique identifier of the IHS, and may also be generated based on the token provided to the workspace 405, which may be based on a unique identifier of the workspace. In this manner, the token included in the handle may be bound to the IHS and to the workspace 405 such that use of the handle on another IHS or by another workspace is detectable.

In some instances, a token specified in a handle may be valid for the duration of the lifespan of the workspace 405. Accordingly, in such instances, no limitations or conditions on the token are specified in the handle. However, in other instances, the validity of a token may be limited according to various conditions specified in the handle. In such instances, the token included in the handle is thus a session token with a limited term of validity. For example, conditions set forth in the handle may specify that the session token is only valid until a certain time. As described with regard to FIG. 1, an IHS according to embodiments may include sensors capable of determining whether a user is in proximity to the IHS. In some instances, conditions set forth in the handle may specify that a session token becomes invalid upon detecting that the user of the IHS can no longer be detected in proximity to the IHS. In another example where the IHS is a laptop computer, the conditions set forth in the handle may specify that the session token is only valid until the lid of the laptop is closed. In another example, the conditions set forth in the handle may specify that the session token becomes invalid if the IHS is moved to a different location, or is moved outside of a specific location.

As described above, a workspace definition may be associated with a security score that is measure based on the security context in which the workspace is deployed. In some embodiments, a session token specified in a handle may be limited based on conditions requiring a minimum security score in order for the token to remain valid. In such embodiments, the workspace management agent 415 may monitor for changes in the security context of the workspace 405. Examples of detected changes in the security context may include a change in the antivirus software in use by the IHS, a change in the network access point used by the IHS, a change in the location of the IHS from a corporate environment to a public location, and/or a change of the individual that is using the IHS. Upon detecting such changes in the security context, a new security score may be calculated for the workspace. If the security score drops below a certain threshold, a session token included in a handle may become invalid.

With the remote access controller 410 and the workspace 405 both provided with the handle generated by the workspace orchestration service 420, the workspace 405 may commence use of the selected IHS resource by using the handle to issue commands to the selected IHS resource. Using the provided handle, at 570, the workspace 405 generates a command that invokes the selected resource of the IHS by generating an API call that is specified in the handle. In some embodiments, these API calls may be generated by a local resource service 335A-N, as described with regard to FIG. 3B, of the workspace 405 that may be configured to managed operations for requesting and managing use of a local resource on behalf of the workspace 405. At 575 and as indicated at 480 of FIG. 4, the workspace 405 transmits the API call to the remote access controller 410 using the IPC resource that is included in the handle for communications between the remote access controller 410 and the workspace 405. At 580, the API call issued via the IPC resource specified in the handle is received by the remote access controller 410. As described with regard to FIG. 3B, remote access controller 410 may include a secure communication support module 350 that is configured to manage communications with workspaces. In particular, this secure communication support module may manage communications with individual workspaces via an IPC resource specified in a handle provided by the workspace orchestration service for communications with that particular workspace.

Upon receipt of an API call from a workspace via the IPC resource, the remote access controller 410 processes the API call on behalf of the workspace. For instance, if a handle provides a workspace 405 with access to ACPI resources of an IHS, an API call received according to that handle is processed by the remote access controller 410 by invoking the corresponding ACPI method of the IHS that may be supported by the BIOS of the IHS, or by the remote access controller 410 itself. In another example, if the API call is received via an IPC resource corresponding to a handle that provides workspace 405 with use of thread management functions supported by an IHS, the data received by the remote access controller 410 via the IPC resource is used to perform thread management functions on behalf of the workspace. Once the operation invoked on behalf of the workspace 405 has been completed, at 585 and as indicated at 485 of FIG. 4, the remote access controller 410 utilizes the IPC resource provided in the handle to provide the workspace 405 with a responsive communication specified by the API call made by the workspace. For instance, if an ACPI method requesting the current power state of the IHS has been invoked by the API call received from the workspace 405, the response by the remote access controller 410 relays the current power state back to the workspace via the IPC resource specified in the handle.

Referring back to FIG. 3B, various systems and methods described herein may enable the management of GPU 376A-N usage by workspaces 331A-N using graphics performance module 370 in cooperation with local management agent 332, kernel components 371, and/or orchestration service 206. Particularly, FIGS. 6-9 are swim lane diagrams describing certain steps of methods 600-900, according to some embodiments, for managing graphics processor usage by modern workspaces.

With multiple workspaces tied to an individual user, and also, at any one time, multiple workspaces running concurrently on an IHS, the limits of GPU resources can be reached and hence operate under performance constraints for a given collective set of workloads across concurrent workspaces. Identifying how GPU resources should be applied across workspace workloads, and more broadly determining where a workspace most optimally runs based on GPU utilization (e.g., workspaces on client or rendering purely from backend through web application or progressive web application (PWA), etc., as well as contextually bringing workspaces into the IHSs' locale versus cloud), is a key issue arising from this new workspace environment.

Given that a user may have multiple workspaces running on an IHS, the problem of running multiple relevant workspaces concurrently comes up for given constrained graphics resources. Many IHSs are, in fact, constrained to one GPU, whether discrete or integrated.

There are numerous use cases where graphics workloads are constrained, across all lines of business: for example, a power user may be working on two Autocad models: a first one he is reviewing at runtime—a graphics intensive process—and a second is being rendered in the background. Each of these designs is in a separate workspace. As another example, a user may be accessing an application through Virtual Desktop Infrastructure (VDI), which requires local distributed graphics support, while separately running an intelligent collaboration application with video offload taking up GPU resources for the offload in a separate window (note that these graphics workloads may be shared across integrated GPU). As still another example, a gaming user may be live streaming his game using video encode tied to GPU subsystem, while playing the game (which takes up the GPU obviously). As yet another example, another gaming user may be running a graphics intensive game while having a local machine learning (ML) inference engine using GPU accelerated Tensorflow workload for object detection, etc. Each of these use cases require concurrently running workspaces to be managed around graphics constraints.

Today's mobile IHSs tend to have a single GPU resource, whereas desktop or server IHSs may scale to multiple GPUs. Moreover, for some GPUs supporting workspace environments, the GPU can only be accessed by systems supporting a single workspace engine to run multiple workspaces, and moreover, the workspace engine is optimized to balance over multiple GPUs. In this environment, when a client IHSs typically supports one discrete GPU, the ability to load balance based on workspace workload is restricted. Furthermore, in most instances, otherwise conventionally containerized environments are not capable of limiting GPU resources taken by a given container—the only option is to set the GPU clocks to lower frequency before starting the workspace to conserve resources.

As modern mobile IHSs shift workloads away from the CPU and trade-off power/performance between GPU and increasing artificial intelligence (AI) acceleration workloads, one has to smartly manage the list of active workspaces, including maximum GPU requirements (runtime) and which individual workspaces are running. Accordingly, various embodiments described herein enable the improvement or optimization of multiple workspaces running concurrently on an IHS within constrained GPU resources without impacting, and in fact, optimizing the overall user experience.

Particularly, systems and methods described herein may identify and classify workspaces based on GPU workloads by application (e.g., whitelist, empirical, or learned behavior), and may categorize workspaces based on GPU requirements (e.g., Category 1: no GPU required—ignore; Category 2: assign GPU resource if available, can share GPU resource with normal scheduling and compute preemption; Category 3: assign GPU resource if available, can share under services control (stop/start); and Category 4: high GPU resource utilization).

A real-time OS service running above the OS, but alongside the workspaces's local management agent, may interface with it through processing monitoring or APIs, and determine real-time actions from categorization. The real-time OS service may start or hibernate a workspace with assigned GPU service for high utilization, share GPU resources across workspace, multitask across single GPU under service control, etc. For example, in a non-limiting implementation, the real-time OS service may start a workspace and run on specific GPU (e.g., "$ docker run –gpus device=1 nvidia/cuda:9.0-base nvidia-smi"), and/or it may hibernate a workspace (e.g., by creating a checkpoint with a folder path).

Figure 6:
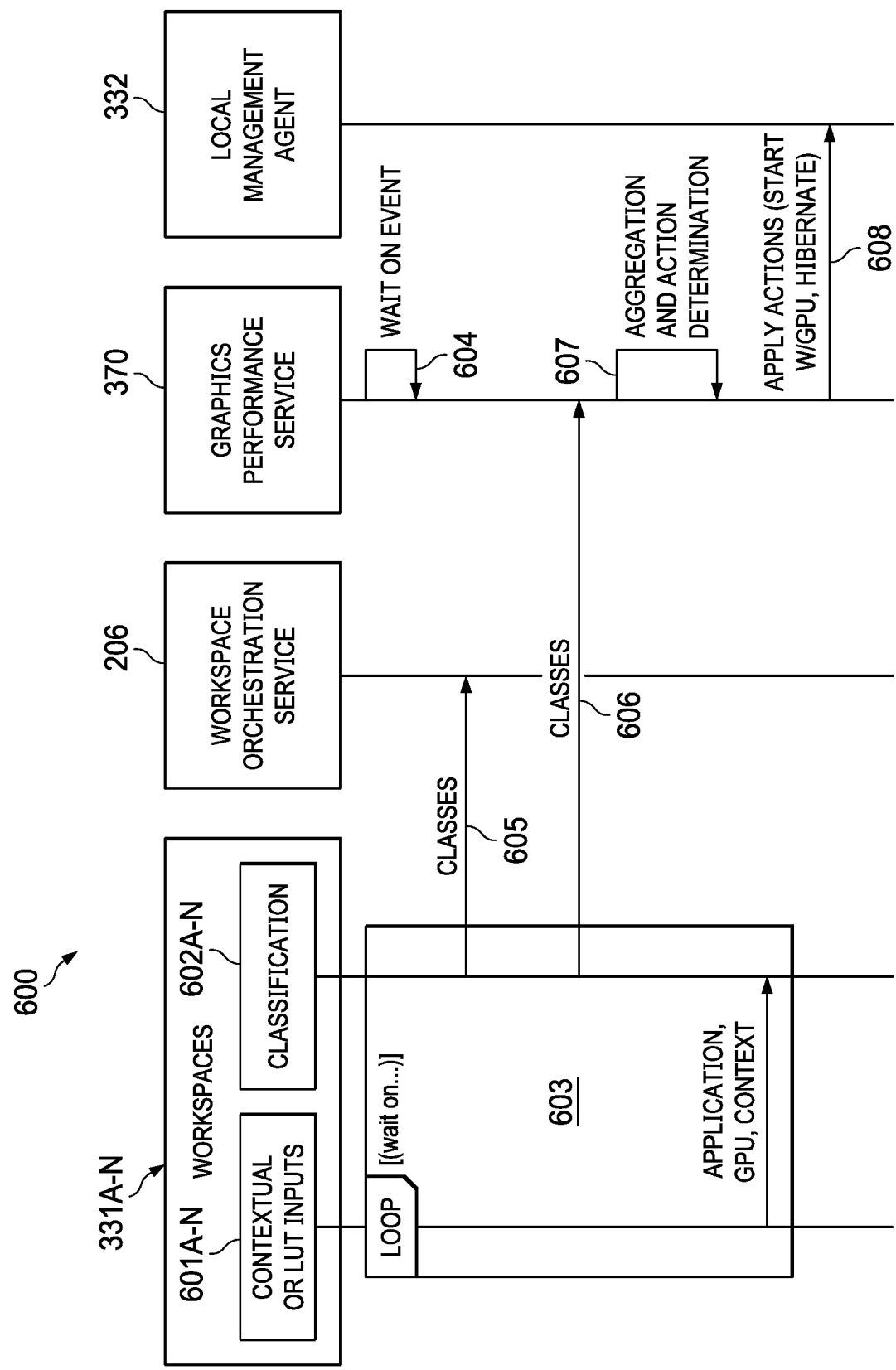
FIGS. 6-9 are swim lane diagrams describing certain steps of methods, according to some embodiments, for managing graphics processor usage by modern workspaces.

In FIG. 6, an example of method 600 for assigning container workloads in constrained graphics resource environments is depicted. In some cases, contextual inputs 601A-N and classification 602-N may be performed by local resource services 355A-N of each respective workspace 331A-N. These components may operate in loop 603 to continuously or periodically receive context information from each of workspaces 331A-N and to classify their workloads. For example, a workspace may be classified by loop 603 as "personal" if its workload includes one or more personal PWAs, a browser window pointed to an email server, another browser window pointed to a bank server address, etc. Another workspace may be classified by loop 603 as "corporate" if its workload includes a high-productivity application (e.g., Autocad) a document suite application, and a browser window pointed to a software development server address. Yet another workspace may be classified by loop 603 as "productivity" if its workload includes one or more collaboration applications, a document suite application, and a browser window pointed to a corporate server address).

In some embodiments, in order to perform classification/categorization operations, loop 603 may identify real-time graphics requirements and/or memory requirements from each workspace 331A-N, and it may apply look-up table(s) and/or ML algorithm(s) to output a workload descriptor for the corresponding workspace. In certain embodiments, loop 603 may be offloaded to (and performed by) workspace orchestration service 206.

As loop 603 operates, at 604, graphics performance service 370 waits for an event (e.g., the user selects an application, etc.). At 605, classification operations 602A-N output workspace descriptors to workspace orchestration service 206, and at 606 classification operations 602A-N output workspace descriptors and/or classes based on resource requirements to graphics performance service 370.

At 607, graphics performance service 370 performs aggregation and action determination operations. In some cases, for example, actions may be determined or identified based upon a graphics processing policy received from workspace orchestration service 206 as part of a workspace definition or the like and/or applicable to a given workspace (or not) as prescribed by its definition. Then, at 608 graphics performance service 370 executes one or more identified actions for a given workspace's graphical workload via local management agent 332 (e.g., run, hibernate, migrate, etc.) and/or directly via kernel driver 372 (e.g., prioritizing GPU calls in GPU queue(s) 374, assigning a dedicated/shared and/or discrete/integrated GPU 376A-N, etc.).

Table I illustrates examples of classifications and corresponding actions used in a non-limiting implementation of method 600:

TABLE I

Examples of Classifications and Actions.

| Classes | Description | Actions |
|---|---|---|
| 1 | Class 1: No GPU required | Ignore; start independent of GPU resources |
| 2 | Class 2: Assign GPU resource if available | Can share GPU resource with normal scheduling and compute preemption; start with similar Class workspaces |
| 3 | Class 3: Assign GPU resource if available; can share under services control | Use stop/start workspace operations to schedule workspaces on limited GPU workloads |
| 4 | Class 4: High GPU resource utilization; | Start on separate GPU in multi-GPU environment; stop/start exclusive on single GPU |

Moreover, Table II shows examples of workspace GPU rules engine implemented in in a non-limiting implementation of graphics performance service 370:

TABLE II

Examples of GPU Rules Engine Implementation.

| Use Case | Classification | GPU Resource | Actions |
|---|---|---|---|
| A power user is working on two Autocad models: Design 1 model reviewed in foreground. Design Model 2 is being rendered in the background. | Class 4 (high) for both models | Discrete GPU | Option 1 : Stop/Start/Hibernate workspace in background; maximize foreground workspace. Option 2: Stop background workspace, workspace can restart off box if cloud resources available. |

TABLE II-continued

Examples of GPU Rules Engine Implementation.

| Use Case | Classification | GPU Resource | Actions |
|---|---|---|---|
| A user is accessing an application through VDI which requires graphics support, while separately running an intelligent collaboration application with video offload in a separate window. | Class 2 for both applications | Integrated or discrete GPU | Start both workspaces on discrete GPU |
| A game developer is switching between graphics editing application for game development and an interactive game for testing purposes. | Application - Class 3; Game - Class 4 | Discrete GPU | Stop/Start/Hibernate workspace when in focus |

Figure 7:
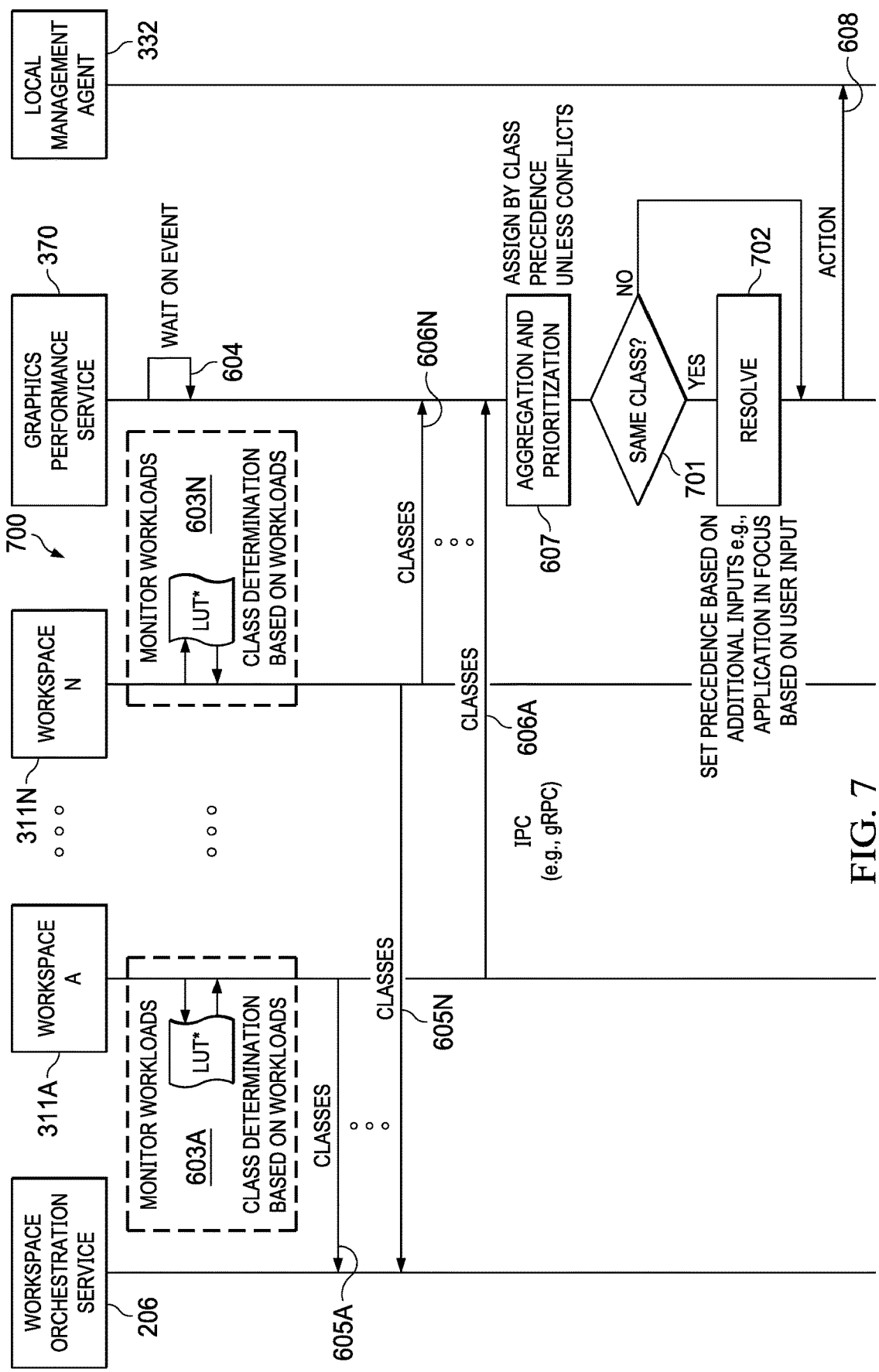
Figure 8:
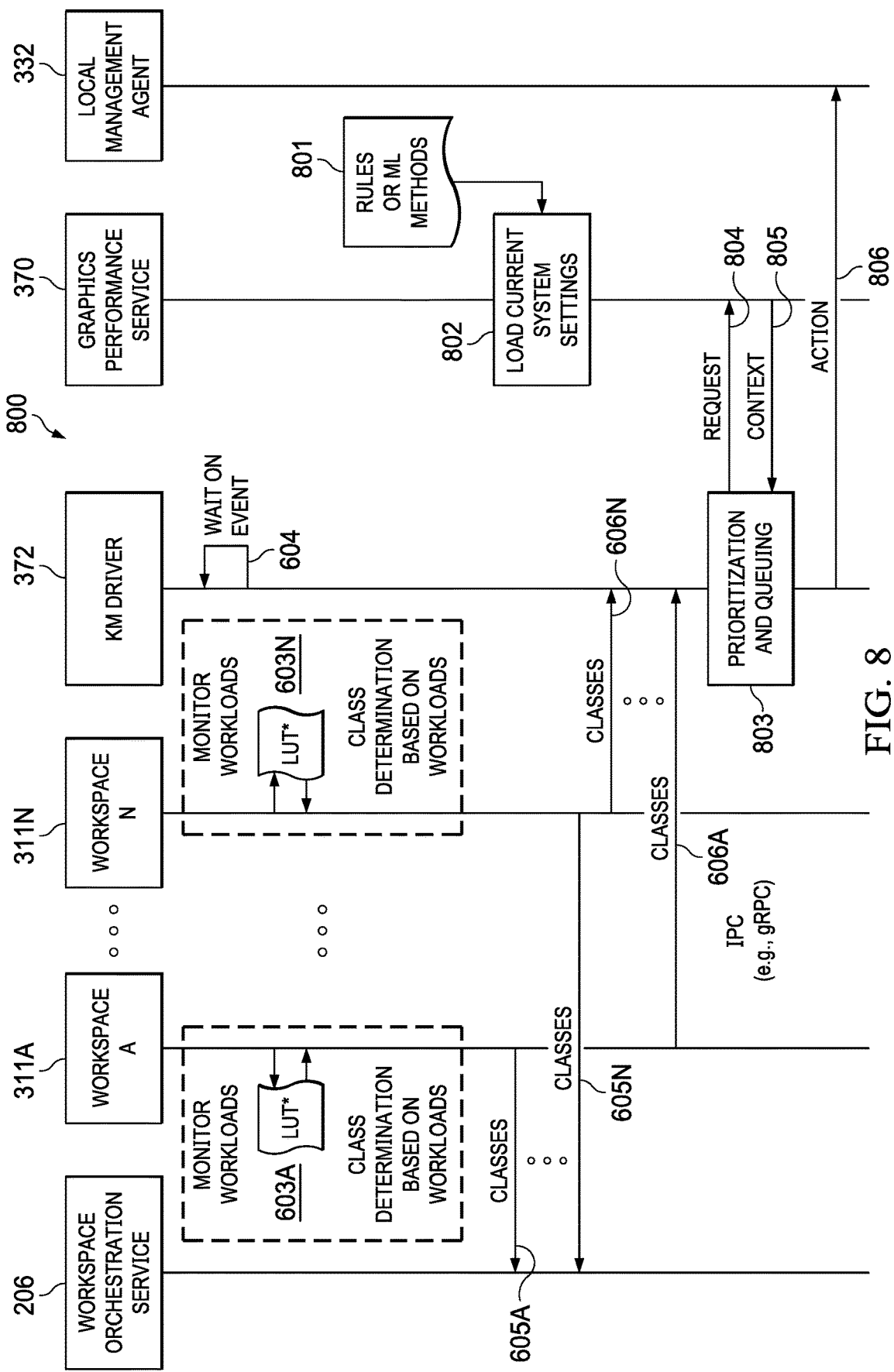

In FIG. 7, method 700 begins at block 603A through 603N for workspaces 311A through 311N, where each such block monitors its respective workspace's 311A-N graphics workloads and, using a look-up-table (LUT) or the like (e.g., an application whitelist, GPU queuing requirements, etc.), makes a class determination for that workspace. Resulting classification information 605A through 605N is sent to workspace orchestration service 206, and information 606A through 606N is sent to graphics performance service 370, for instance, using inter-process communications (IPC, such as a remote procedure call or "RPC"), while graphics performance service 370 waits for such an event 604.

At 607, graphics performance service 370 aggregates and prioritizes graphics calls from each workspace and GPUs are assigned by class, unless or until conflicts arise between graphics call issued by different applications or workspaces. At block 701, if no two or more graphics calls belong to the same class, there is no conflict. Conversely, if two or more graphics call are in the same class, block 702 resolves the conflict in any suitable manner such as by based on context (e.g., a given application is in focus, as determined based on user input, therefore its graphics calls receive a higher priority). Then, responsive action is identified and/or executed at 608 by local management agent 332 and/or kernel components 371.

As workloads grow, there is a need to optimize graphics performance in real time across workspaces. Moreover, given the dynamic nature of the end users' activities, this optimization can be further enhanced by learned behaviors representing user intent. For example, consider a user may executing a design application requiring GPU-intensive rendering in the background, while optimizing for a real-time video streaming that requires some GPU assistance. In this case, consider a scenario where the user is detected as not participating in the video streaming, or even have it running in background, which would allow the rendering larger GPU bandwidth. As another example, consider a user concurrently executing a productivity collaboration application involving GPU rendering, and a GPU subsystem-based video streaming application.

To address these situations, in some embodiments, systems and methods described herein may use kernel mode driver 372 having a multi-workspace GPU queue(s) 374 to throttle performance as needed across workspaces. For example, in FIG. 8, operations 603-606 are similar as described above. At 801, graphics performance service 370 receives rules of ML algorithms, and at 802 it loads current IHS settings.

At 803, kernel mode driver 372 prioritizes and queues graphics calls from multiple workspaces 311A-N by requesting context information at 804 and receiving that information at 805. Particularly, kernel mode driver 372 can pass calls to local management agent 332 including assignment of workspaces 311A-N to GPUs A-N. In steady state operation, kernel mode driver 372 intercepts GPU functional calls (e.g., assigning all GPU calls to a single virtual driver handle 373), and prioritizes requests to one or more GPU queue(s) 374 (e.g., one queue for each GPU, one queue for two or more shared GPUs, and/or a single queue for all GPUs).

To prioritize GPU requests in GPU queue(s) 374, kernel mode driver 372 may, for example: (a) perform static assignments based on whitelist of known applications (e.g., real-time applications receive highest priority queue, background rendering medium to lowest priority queue, etc.); (b) apply IT-defined rules for specific workspace classes with select user overrides based on preference; (c) performed default assignment based on the foregoing, but with dynamic adjustment of queue assignments based on context (e.g., real-time application is currently in the background so it may be prioritized to lower queue and rendering task raised in priority); and/or (d) service queues on modified round robin basis, where the frequency of service is set higher for higher priority queues (e.g., for three queues, a highest priority queue may be serviced every other cycle, a medium priority queue may be serviced every three of four of alternate cycles, and a lowest priority queue may be serviced only during the remaining cycle (e.g., one of eight).

In some embodiments, graphics performance service 370 may operate as a context engine that monitors IHS context (e.g., applications in focus, etc.) and user context (e.g., presence or proximity, etc.). Graphics performance service 370 may pass additional rules/inferences to kernel mode driver 372 to enable it to adapt the priority and resulting queue assignments for different workspace workloads. In some embodiments, contextual rules may serve as inputs to modify the cadence of the priority queues, allowing higher bandwidth for mission critical tasks. Graphics performance service 370 may also monitor and apply rules, or in other embodiments apply ML methods to contextual datasets based on user behavior. Once the queued graphics calls are prioritized, corresponding actions 806 may be sent to local management agent 332.

In some cases, graphics processor usage optimization may involve taking advantage of specific capabilities and features of a discrete GPU, recognizing GPU limitations, and scaling graphics workloads associated with an application according to those limitations. In many instances, optimizing graphics process usage may also include restarting a workspace on specific GPU resource based on that GPU's resource capabilities. In both cases, the ability for a workspace or application to discover the capabilities of the underlying GPU resources assigned to it may play a role in establishing runtime actions.

In a conventional, native application environment, traditional APIs exist to support an application's query of underlying GPU resources. However, applications running inside workspaces cannot communicate directly with resources outside their workspaces. To address this, systems and methods described herein may enable workspaces to establish connections to an IHS's GPU resources, and to discover and leverage their capabilities.

Particularly, in a discovery and initial communication phase, a connection between a web application or workspace and an endpoint may be established. For example, a local secure and managed port inside the web application or workspace can communicate through IPC to specific known entity outside the workspace. Also, a connection to a manageability/secure backend HTTPS service, for example, as provided by workspace orchestration service 206, may be initiated.

Graphics performance service 370 may have access to KM driver 372 and to the underlying GPU APIs. Local resource service 355A (e.g., a web application service), for instance, may discover the IPC port through a secure web service method (e.g., a method used for authentication via the BIOS). A separate backend service provided by workspace orchestration 206 may handle manageability/security around secure port set up. Graphics performance service 370 may use the same service and provide runtime GPU capabilities to local resource service 355A.

Moreover, local resource service 355A may apply any suitable method for a workspace to talk to GPUs 376A-N securely (e.g., ACPI) to exchange capabilities negotiation. The following JSON object values are provided to illustrate a non-limiting example:

var GPUconfig={
DeviceID DeviceName NumberCores CacheSize LocalMemorySize AtomicMemoryCaps DeviceEnqueue ImageSupport ImageMaxArraySize ImageMaxBufferSize MaxComputeUnits MaxSamplers MaxParamSize MaxOnDeviceEvents MaxOnDeviceQueues
}
: "0x1f11",
: "GeForce RTX 2060", : 1920,
: 4194304,
: 6442450944,
: True,
: True,
: True,
: 2048,
: 65536,
: 16,
: 16,
: 1024,
: 1024,
: 4,
//4096 KB or 4096*1024 //6 GB or 6*1024*1024*1024

Lastly, responsive actions may be identified based on application workload and JSON object capabilities (e.g., set runtime throttling based on GPU resource and application workload). In some cases, assigned actions may passed as part of same graphics performance service 370 to a GPU. In other cases, assigned actions may pass through abstraction layer (assigned to GPU Handle 373) and assigned by KM driver 372 to the GPU. In yet other cases, discovery for web applications may use IPC.

Figure 9:
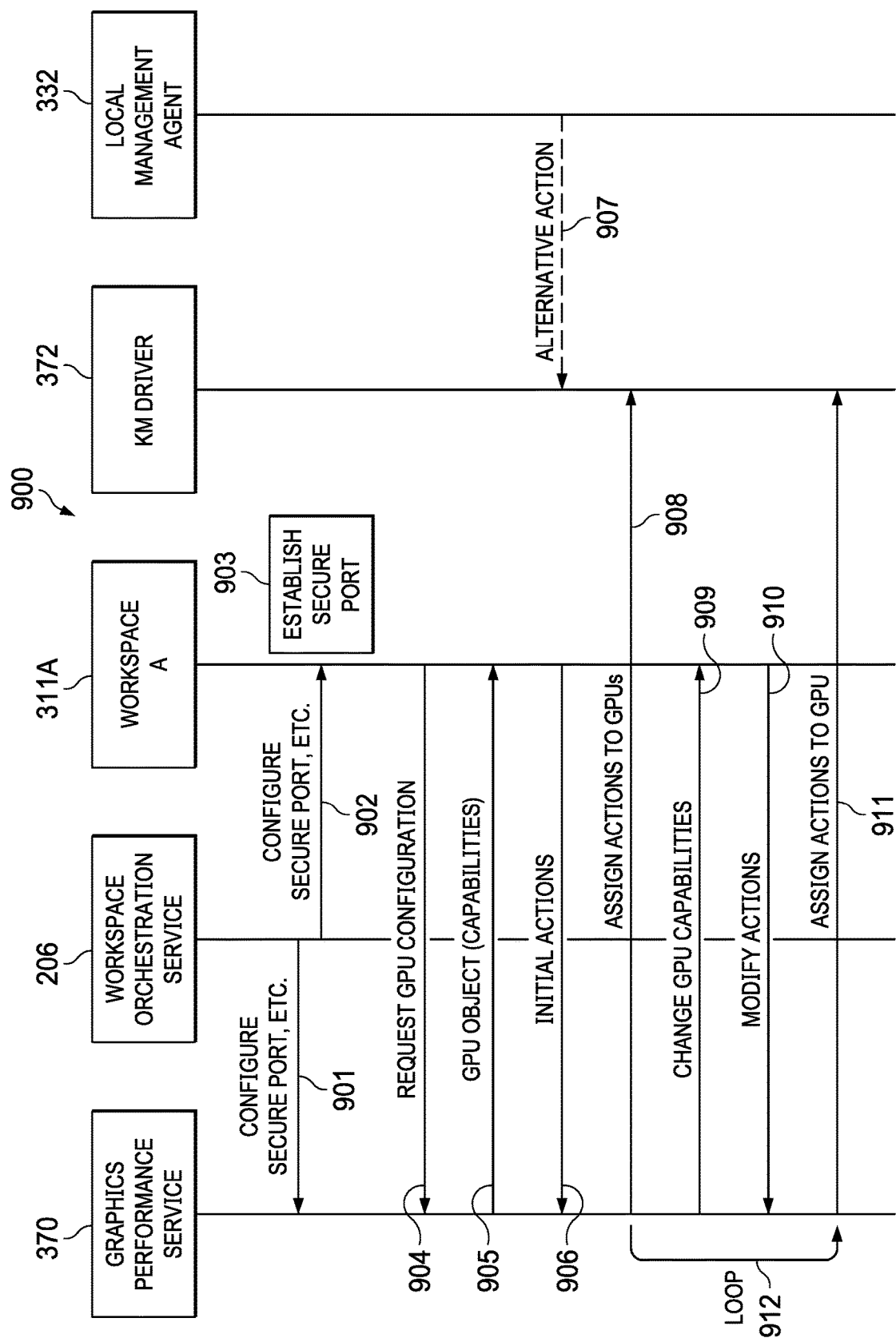

In FIG. 9, method 900 begins when workspace orchestration service configures a secure port with graphics performance service 370 at 901 and with workspace 311A (e.g., local resource service 355A) at 902 to establish a secure port at 903 (for example, implementing methods described in FIGS. 4 and 5). At 904, workspace 311A requests GPU configuration information from graphics performance service 370, and at 905 graphics performance service 370 returns that information to workspace 311A.

At 906, workspace 311A sends initial actions (e.g., GPU calls) to graphics performance service 370, and at 908 graphics performance service 370 assigns those actions to GPUs 376A-N via kernel mode driver 372. Additionally, or alternatively, kernel mode driver 372 may receive alternative actions (e.g., workspace GPU assignments) from local management agent 332. At 909, graphics performance service 370 may notify workspace 311A of a change in GPU capabilities. In response, workspace 311A modifies actions at 910 with graphics performance service 370, and graphics performance service 370 re-assigns those actions to GPUs 376A-N via kernel mode driver 372. In some cases, operations 909-911 may be repeated as loop 912.

As such, systems and methods described herein may adaptively optimize an IHS graphics for multiple concurrent workspaces for modern work without impact user experience, applying rules for assigning GPU workloads. Additionally, or alternatively, systems and methods described herein may create and arbitrate queues for real-time prioritization to optimize workspace GPU workloads with adaptive and learned arbitration and real-time override of prioritization, as well as transparent switching of GPU workloads based on user intent. Additionally, or alternatively, systems and methods described herein may enable the secure discovery of GPU capabilities on an IHS and inform a workspace with web or native applications of those capabilities for, example, for improved classification decision-making.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
   determine a graphical processing characteristic of each of a plurality of workspaces; and
   identify a responsive action for a given one of the plurality of workspaces based, at least in part, upon the graphics processing characteristic of the given workspace,
   wherein the responsive action is prescribed by a rule of a graphics configuration policy received from a workspace orchestration service,
   wherein a local management agent executed by the IHS is configured to receive, from the workspace orchestration service, data configured to enable the local management agent to instantiate each of the plurality of workspaces based upon a corresponding one of a plurality of workspace definitions,
   wherein each workspace definition identifies whether its respective workspace is subject to the graphics configuration policy,
   wherein the workspace orchestration service is configured to, for each of the plurality of workspaces:
      (i) calculate a security target and a productivity target based in part upon context information received from the local management agent comprising at least one of: an identification of a locale of the IHS, an identification of a user of the IHS, an identification of a network of the IHS, an identification of a hardware of the IHS, an identification of a requested datafile, or an identification of a storage system of the requested datafile, and
      (ii) create a workspace definition based upon the security target and the productivity target.

2. The IHS of claim 1, wherein the responsive action comprises starting or stopping graphics calls from the given workspace.

3. The IHS of claim 1, wherein the responsive action comprises outsourcing graphics calls from the given workspace to a remote server.

4. The IHS of claim 1, wherein the responsive action comprises assigning the given workspace of a dedicated one of a plurality of Graphical Processing Units (GPUs).

5. The IHS of claim 1, wherein the responsive action comprises assigning the given workspace of a shared one of a plurality of Graphical Processing Units (GPUs).

6. The IHS of claim 1, wherein the responsive action comprises assigning the given workspace to a different Graphical Processing Unit (GPU) than an originally assigned GPU at instantiation of the given workspace.

7. The IHS of claim 1, wherein the responsive action comprises assigning the given workspace to one of: an integrated Graphical Processing Unit (GPU), or a discrete GPU.

8. The IHS of claim 1, wherein the program instructions, upon execution, further cause the IHS to categorize each of the plurality of workspaces based upon one or more graphical processing characteristic of each workspace as: high utilization, medium utilization, or low utilization.

9. The IHS of claim 1, wherein the program instructions, upon execution, further cause the IHS to:
   receive a first graphics call from a first workspace;
   store the first graphics call in a queue;
   receive a second graphics call from the second workspace;
   store the second graphics call in the queue; and
   process the second graphics call prior to the first graphics call in response to the second workspace having a higher graphics priority than the first workspace.

10. The IHS of claim 9, wherein the program instructions, upon execution, further cause the IHS to determine that the second workspace has a higher graphics priority than the first workspace based upon a second graphics processing characteristic of the second workspace indicating execution of a second application requiring real-time rendering and a first graphics processing characteristic of the first workspace indicating execution of a first application not requiring real-time rendering.

11. The IHS of claim 9, wherein the program instructions, upon execution, further cause the IHS to determine that the second workspace has a higher graphics priority than the first workspace based upon context information associated with at least one of the first or second workspaces.

12. The IHS of claim 11, wherein the context information comprises at least one of an identity or type of an application being executed in the first or second workspaces, whether the application is executing in a foreground, or whether the application is executing in a background.

13. The IHS of claim 11, wherein the context information comprises at least one of: a presence state of a user, or a proximity of the user to a display coupled to the IHS.

14. The IHS of claim 11, wherein the context information comprises at least one of: a location of the IHS or a posture of the IHS.

15. The IHS of claim 1, wherein the program instructions, upon execution, further cause the IHS to discover one or more attributes of a Graphical Processing Unit (GPU) of the IHS and pass the one or more attributes to the given workspace.

16. A memory storage device having program instructions stored thereon that, upon execution by an Information Handling System (IHS), cause the IHS to:
   determine a graphics processing characteristic of each of a plurality of workspaces; and
   identify a responsive action for a given one of the plurality of workspaces based, at least in part, upon the graphics processing characteristic of the given workspace, wherein the responsive action is prescribed by a rule of a graphics configuration policy received from a workspace orchestration service, wherein a local management agent executed by the IHS is configured to receive, from the workspace orchestration service, data configured to enable the local management agent to instantiate each of the plurality of workspaces based upon a corresponding one of a plurality of workspace definitions, wherein each workspace definition identifies whether its respective workspace is subject to the graphics configuration policy, wherein the workspace orchestration service is configured to, for each of the plurality of workspaces:
   (i) calculate a security target and a productivity target based in part upon context information received from the local management agent comprising at least one of: an identification of a locale of the IHS, an identification of a user of the IHS, an identification of a network of the IHS, an identification of a hardware of the IHS, an identification of a requested datafile, or an identification of a storage system of the requested datafile, and
   (ii) create a workspace definition based upon the security target and the productivity target.

17. In an Information Handling System (IHS), a method comprising:

determining a graphics processing characteristic of each of a plurality of workspaces; and identifying a responsive action for a given one of the plurality of workspaces based, at least in part, upon the graphics processing characteristic of the given workspace, wherein the responsive action is prescribed by a rule of a graphics configuration policy received from a workspace orchestration service, wherein a local management agent executed by the IHS is configured to receive, from the workspace orchestration service, data configured to enable the local management agent to instantiate each of the plurality of workspaces based upon a corresponding one of a plurality of workspace definitions, wherein each workspace definition identifies whether its respective workspace is subject to the graphics configuration policy, wherein the workspace orchestration service is configured to, for each of the plurality of workspaces:
   (i) calculate a security target and a productivity target based in part upon context information received from the local management agent comprising at least one of: an identification of a locale of the IHS, an identification of a user of the IHS, an identification of a network of the IHS, an identification of a hardware of the IHS, an identification of a requested datafile, or an identification of a storage system of the requested datafile, and
   (ii) create a workspace definition based upon the security target and the productivity target.

* * * * *

UNITED STATES PATENT AND TRADEMARK OFFICE
CERTIFICATE OF CORRECTION

PATENT NO. : 11,410,267 B1  
APPLICATION NO. : 17/198320  
DATED : August 9, 2022  
INVENTOR(S) : Gatson et al.

Page 1 of 1

It is certified that error appears in the above-identified patent and that said Letters Patent is hereby corrected as shown below:

In the Claims

In Column 35, Line 18, Claim 16, delete "of: an identification of a locale of the THS, an" and insert -- of: an identification of a locale of the IHS, an -- therefor.

Signed and Sealed this
Thirteenth Day of September, 2022

Katherine Kelly Vidal
*Director of the United States Patent and Trademark Office*